United States Patent [19]

Hino et al.

[11] Patent Number: 5,539,534
[45] Date of Patent: Jul. 23, 1996

[54] METHOD OF SCALING AN IMAGE CAPABLE OF LINE WIDTH PRESERVATION

[75] Inventors: Masatoshi Hino, Zama; Narihiro Munemasa, Yokohama, both of Japan

[73] Assignee: Hitachi, Ltd., Tokyo, Japan

[21] Appl. No.: 69,865

[22] Filed: Jun. 1, 1993

[30] Foreign Application Priority Data

Jun. 3, 1992 [JP] Japan .................. 4-142684

[51] Int. Cl.$^6$ .................. H04N 1/387; H04N 1/393
[52] U.S. Cl. .................. 358/452; 358/448; 358/451; 382/298
[58] Field of Search .................. 358/443, 445, 358/447, 448, 451, 452; 382/47, 276, 298, 299, 300, 293; 395/139

[56] References Cited

U.S. PATENT DOCUMENTS

| | | | |
|---|---|---|---|
| 4,930,021 | 5/1990 | Okada | 358/445 |
| 5,068,905 | 11/1991 | Hackett et al. | 358/451 |
| 5,089,893 | 2/1992 | Iwase | 382/47 |
| 5,121,222 | 6/1992 | Endoh et al. | 358/451 |

FOREIGN PATENT DOCUMENTS 1-080167  3/1989  Japan .

OTHER PUBLICATIONS

Arai, Kohei, et al. "A Study on Facsimile Line–Density Conversion Scheme," (An Analysis of Linear Density Conversion of Facsimile,) Journal of the Institute of Image Electronics Engineers of Japan, vol. 7, No. 1, 1978, pp. 11–18. (English—Summary Only).

Endoh, Toshiaki, et al. "Reduction Method of Bi-Level Image with Thin Line Preservation," IECE Fall Conference, 1989, pp. (D-86) 6-86. (Japanese).

Okada, Yoshiyuki, et al. "Fine Line Preservation Algorithm of Reduction for Bi-Level Images," IECE Spring Conference, 1990, pp. (D447) 7-199. (Japanese).

Primary Examiner—Scott A. Rogers
Assistant Examiner—Thomas D. Lee
Attorney, Agent, or Firm—Fay, Sharpe, Beall, Fagan, Minnich & McKee

[57] ABSTRACT

In scaling an image, a projected position is corrected in accordance with pixel values of original pixels surrounding a projected position where a pixel of a scaled image is projected onto an original image, and a pixel value of a pixel of a scaled image is determined in accordance with pixel values of original pixels surrounding a projected position after correction. Further, when a pixel of an original image is processed with a pixel run as a unit, coordinates of an end pixel of a pixel run in a scaled image are corrected based on the width of the pixel run and a scale factor.

9 Claims, 20 Drawing Sheets

ORIGINAL IMAGE → SCALED IMAGE $i_x$ : INTEGRAL PART OF x
$i_y$ : INTEGRAL PART OF y
$d_x$ : FRACTIONAL PART OF x
$d_y$ : FRACTIONAL PART OF y $r_x = 1.3$
$r_y = 1.3$

F I G. 4a
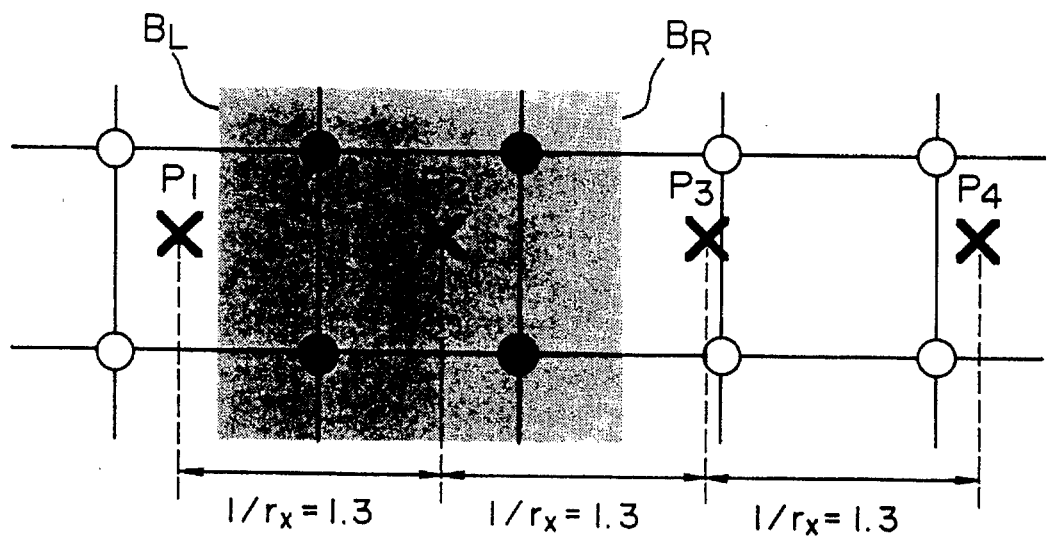
F I G. 4b
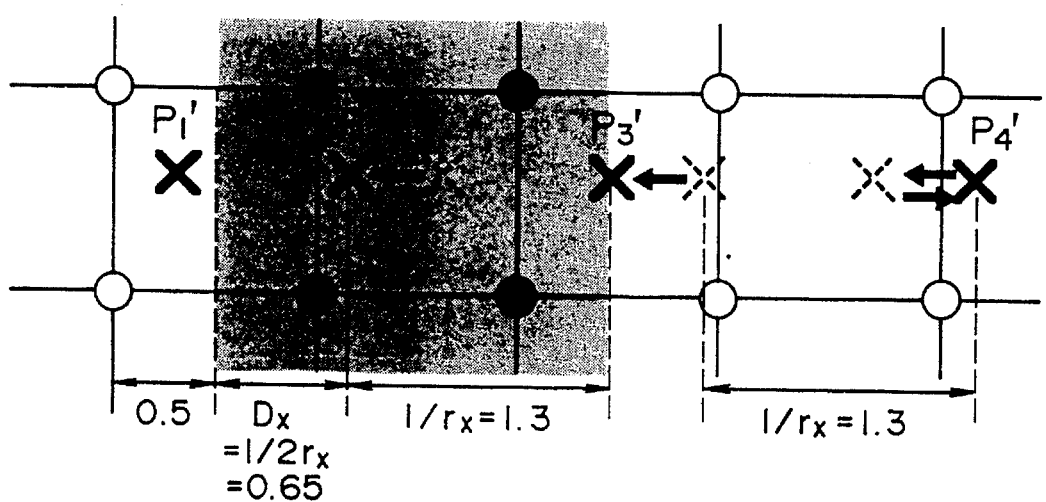

ORIGINAL IMAGE

SCALED IMAGE ACCORDING TO
PRESENT INVENTION (×0.7)

$$X_s = [x_s \times r_x + 0.5]$$
$$X_e = [x_e \times r_x + 0.5]$$

$\begin{bmatrix} \phantom{xxxxx} \end{bmatrix}$ : RUN $[2 \times 1/1.3 + 0.5] = 2$  $\qquad$ $[7 \times 1/1.3 + 0.5] = 5$
$[3 \times 1/1.3 + 0.5] = 2$  $\qquad$ $[8 \times 1/1.3 + 0.5] = 6$ $X_s = [x_s \times r_x + 0.5]$
$X_e = X_s + W - 1$
$W = [(x_e - x_s + 1) \times r_x + 0.5] - 1$

[- - -] : RUN $[2 \times 1/1.3 + 0.5] = 2$
$2 + [2 \times 1/1.3 + 0.5] - 1 = 3$ $[7 \times 1/1.3 + 0.5] = 5$
$5 + [2 \times 1/1.3 + 0.5] - 1 = 6$

FIG. 16

| x COORDINATE | | y COORDINATE OF START PIXEL | CONNECTION FLAG |
|---|---|---|---|
| START PIXEL | END PIXEL | | |
| $X_{ls}$ | $X_{le}$ | $y_{ls}$ | ON OR OFF |

FIG. 20a

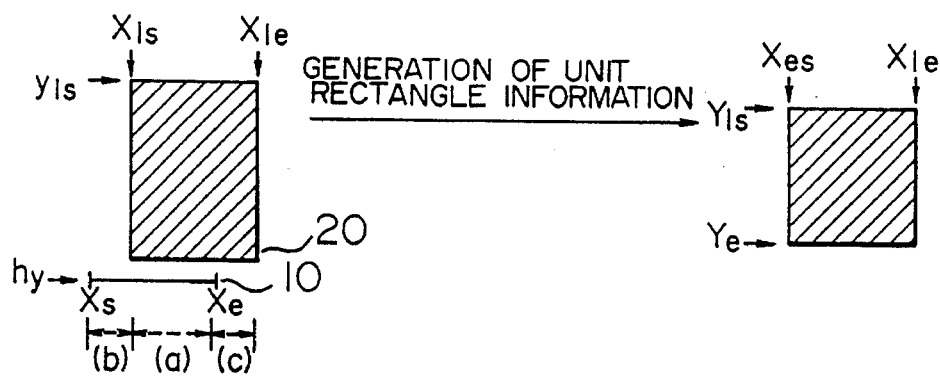

GENERATION OF UNIT RECTANGLE INFORMATION

FIG. 20b

PRIMARY RECTANGLE INFORMATION TABLE

| x COORDINATE | | y COORDINATE OF START PIXEL | CONNECTION FLAG |
|---|---|---|---|
| START PIXEL | END PIXEL | | |
| $X_{ls}$ | $X_{le}$ | $y_{ls}$ | OFF→ON |

FIG. 20c

SECONDARY RECTANGLE INFORMATION TABLE

| x COORDINATE | | y COORDINATE OF START PIXEL | CONNECTION FLAG | |
|---|---|---|---|---|
| START PIXEL | END PIXEL | | | |
| $X_{ls}$ | $X_{le}$ | $y_{ls}$ | OFF | (a) |
| $X_s$ | $X_{ls}-1$ | $h_y$ | OFF | (b) |

UNIT RECTANGLE INFORMATION GENERATED — TRACING CONTINUED — NEWLY ENTERED (c) (a) (b)

| x COORDINATE | | y COORDINATE | |
|---|---|---|---|
| START PIXEL | END PIXEL | START PIXEL | END PIXEL |
| $XX_{1s}$ | $XX_{1e}$ | $YY_{1s}$ | $YY_{1e}$ |
|  |  |  |  |
| ⋮ | ⋮ | ⋮ | ⋮ |

METHOD OF SCALING AN IMAGE CAPABLE OF LINE WIDTH PRESERVATION

BACKGROUND OF THE INVENTION

The present invention relates to a method of enlarging/reducing or scaling an image, and more particularly to a method of scaling an image capable of preventing disappearance of thin lines and variations of line widths. Scaling of an image is required in, for example, terminal equipments having communication image sizes different from each other.

The enlargement/reduction process of a digital image (binary level image, multi-level image) in a resampling system is generally to find which position each pixel of an enlarged/reduced image corresponds to when it is projected onto an original image (i.e., inverse mapping), and to determine a pixel value of each pixel of the enlarged/reduced image from that position and pixel values of the original image therearound. Enlarging/reducing will be referred to as scale (scaling) hereinafter for the sake of simplicity except a special case.

A basis of the scaling process of a digital image will be described with reference to FIGS. 1a and 1b.

In FIGS. 1a and 1b, a coordinate system is set with the upper left point of the image as an origin, and an x-axis and a y-axis are set in a row direction and in a column direction, respectively.

When it is assumed that scale factors in x-axis and y-axis directions are $r_x$ and $r_y$, the coordinates (x,y) of a projected position P onto an original image of a pixel Q located at coordinates (X,Y) for a scaled image in FIG. 1a are shown as follows.

$$(x,y)=(X/r_x, Y/r_y)=(i_x+d_x, i_y+d_y)$$

Here, $i_x$ and $i_y$ are to express integral parts and $d_x$ and $d_y$ are to express fractional parts.

The position P on the original image corresponding to one pixel Q of the scaled image is surrounded by four pixels located at four coordinates $(i_x, i_y)$, $(i_x+1, i_y)$, $(i_x, i_y+1)$ and $(i_x+1, i_y+1)$ and located at distances $(d_x, d_y)$ from the coordinates $(i_x, i_y)$ as shown in FIG. 1b.

The process when an analog image is transformed into a digital image is referred to as sampling process, but the scaling process of a digital image is referred to as resampling process sometimes since it may be considered to sample again an image sampled once. In this case, a pixel of a scaled image is referred to as a resampling pixel, and a position projected onto an original image corresponding to the resampling pixel is referred to as a resampling position. Further, the positions of four pixels described above surrounding the resampling position are referred to as reference lattice points. Moreover, the coordinates $(i_x, i_y)$ of an upper left pixel among the lattice points surrounding the resampling position are the coordinates of a reference lattice point R. Furthermore, $(d_x, d_y)$ are referred to as intra-lattice coordinates.

The pixel value of the pixel Q of a processed of four pixels surrounding the resampling position and the intra-lattice coordinates $(d_x, d_y)$ of the resampling position or by the pixel values of four pixels surrounding the resampling position and of pixels therearound and the intra-lattice coordinates $(d_x, d_y)$.

Various concrete methods of scaling an image on the basis of the process described above have been heretofore proposed.

As a conventional method of scaling with a binary level image as an object, for example, a nearest neighbor method or a selective processing conversion method, a projection method, a logical OR method or the like have been known. (See, for example, "An Analysis of Linear Density Conversion of Facsimile", the Journal of the Institute of Image Electronics Engineers of Japan, Vol. 7, No. 1, pp. 11–18, 1978).

In the nearest neighbor method, the pixel value of a pixel nearest to the resampling position is adopted as the pixel value of the resampling pixel.

In the projection method, influence areas are determined around respective pixels of the original image, respectively, and influenced areas are also determined around the resampling position, thus determining the pixel value of the resampling pixel by obtaining weighted mean of pixel values of respective pixels of the original image in accordance with the area of a location where the influenced area and the influence area overlap each other.

In the logical OR method, the pixel value of the resampling pixel is determined by logical OR of pixel values of pixels near the resampling position.

Although the nearest neighbor method and the projection method are excellent in a point that black-to-white pixel ratios of a scaled image to an original image resemble to each other, these methods have such drawbacks that the line width on the scaled image is not determined by the line width of the original image and the scale factor, but varies depending on the resampling position of the pixels which make up the line (which is referred to as line width variation), and fine lines sometimes disappear at time of a reduction process (which is referred to as thin line disappearance).

The logical OR method can prevent thin line disappearance, but cannot prevent line width variation. Furthermore, there is such a drawback that the line width on the scaled image becomes thicker than a line width determined theoretically by the line width of the original image and the scale factor and blurring (disappearance of white area located between black areas) is easily produced, thus being liable to give rise to deterioration of image quality.

Besides, a scaling method in which a function of detecting thin lines disappearing at time of reduction and preventing disappearance thereof is added to the nearest neighbor method or the projection method has been proposed lately in, for example, JP-A-1-80167 (laid open on Mar. 27, 1989) entitled "Method of Reducing and Transforming an Image", an article entitled "Reduction method of bi-level image with thin line preservation", IECE (the Institute of Electronics, Information and Communication Engineers) Fall Conference '89, D-86, 1989, and an article entitled "Fine line preservation algorithm of reduction for bi-level images", IECE Spring Conference '90, D-447, 1990.

In these scaling methods, however, no consideration is given as to prevent line width variation.

FIGS. 2a and 2b show an example of line width variation produced by image reduction process in case the scale factor in the row direction and the column direction is 1/1.3. An example of the relationship between the original image and the resampling position is shown in FIG. 2a. A white circle indicates a pixel having a pixel value of "white" (a white pixel), a black circle indicates a pixel having a pixel value of "black" (a black pixel), and a mark X indicates a resampling position. A reduced image is shown in FIG. 2b. The nearest neighbor method is applied in this example, but other methods are also applicable in like manner. As it is apparent from these figures, two lines which had the same width in the original image have been transformed into two lines having different widths in the reduced image.

SUMMARY OF THE INVENTION

In a conventional scaling method, the width of a line in the image after scaling process is not determined uniquely by the line width in the corresponding original image and the scale factor, but varies depending on the position of the line in the original image.

As a result, a plurality of lines having the same width in the original image appear as lines having different widths in the scaled image in some cases when the scale factor is neither an integer nor one part of an integer, thus deteriorating the image quality as a result of the scaling process.

Accordingly, it is a principal object of the present invention to provide a method of scaling an image capable of preventing disappearance of thin lines and also of transforming a plurality of lines having the same width in an original image into lines having the same width corresponding to a scale factor in a scaled image, too.

The problems of disappearance of thin lines and variations of line widths are caused by a fact that a positional relationship between a resampling position and four pixels (reference lattice points) surrounding the resampling position varies depending on the pixel. Accordingly, it is possible to solve the problems of disappearance of thin lines and variations of line widths by correcting the resampling position so that the positional relationship does not vary depending on the pixel.

According to one aspect of the present invention, it is possible to prevent disappearance of thin lines and variations of line widths by detecting a pixel value near the resampling position and correcting the resampling position in accordance with the detected pixel value.

According to another aspect of the present invention, since an end pixel of a pixel run of a scaled image is obtained from one end pixel or one boundary coordinate and the width of the pixel run of the scaled image, the width of the pixel run is always preserved, thus making it possible to prevent disappearance of thin lines and variations of line widths.

BRIEF DESCRIPTION OF THE DRAWINGS

FIGS. 4a, 4b, 5a and 5b are explanatory diagrams for explaining scaling process by a resampling system according to a first embodiment of the present invention.

FIG. 16 is a structural diagram of a rectangle information table.

FIGS. 20a to 20c are explanatory diagrams showing renewal process of a rectangle information table.

FIG. 22 is a structural diagram of an output table.

DESCRIPTION OF THE PREFERRED EMBODIMENTS

Embodiments of the present invention will be described hereinafter with reference to the drawings. Besides, the present invention is not limited to these embodiments.

Figure 1A:
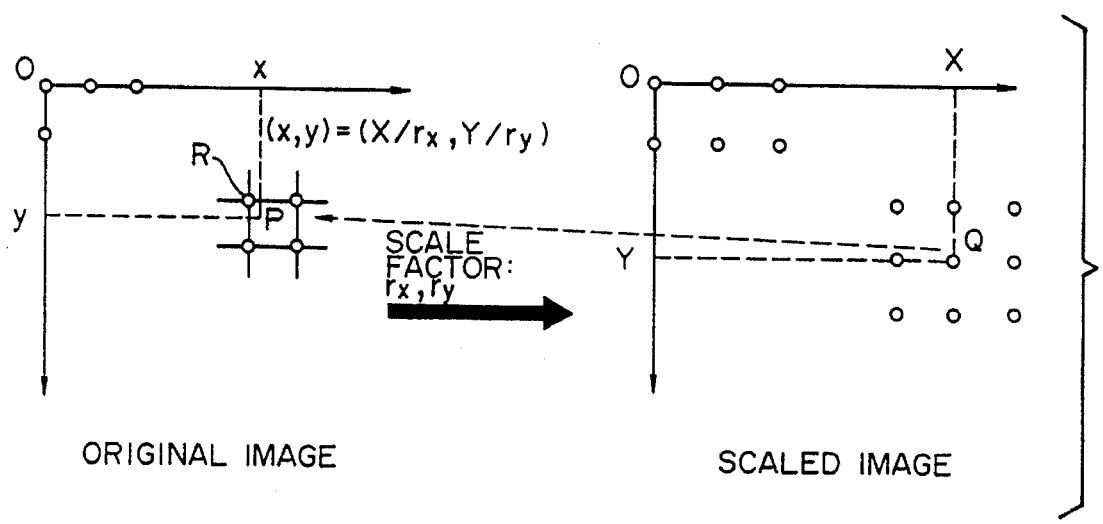
FIGS. 1a and 1b are explanatory diagrams for explaining a scaling process by a conventional resampling system.
Figure 1B:
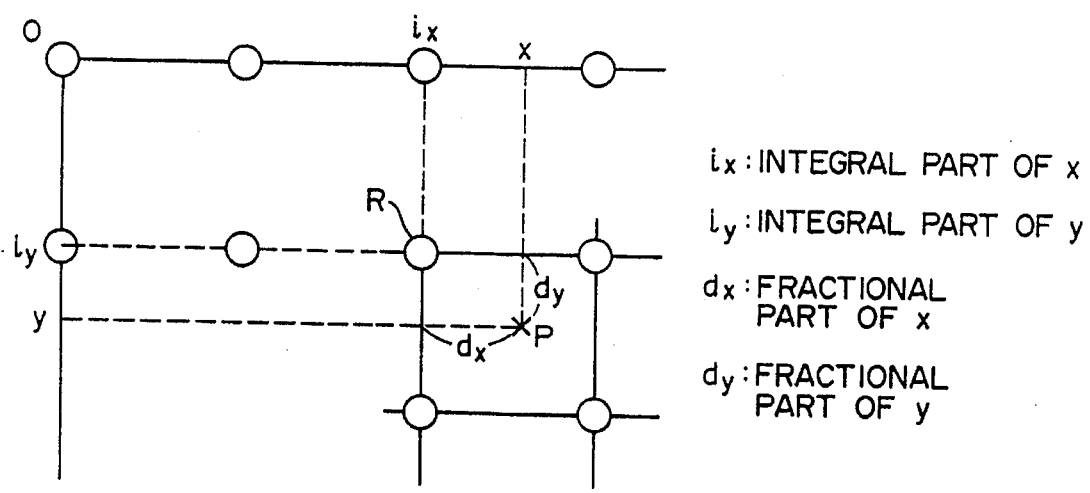
Figure 2A:
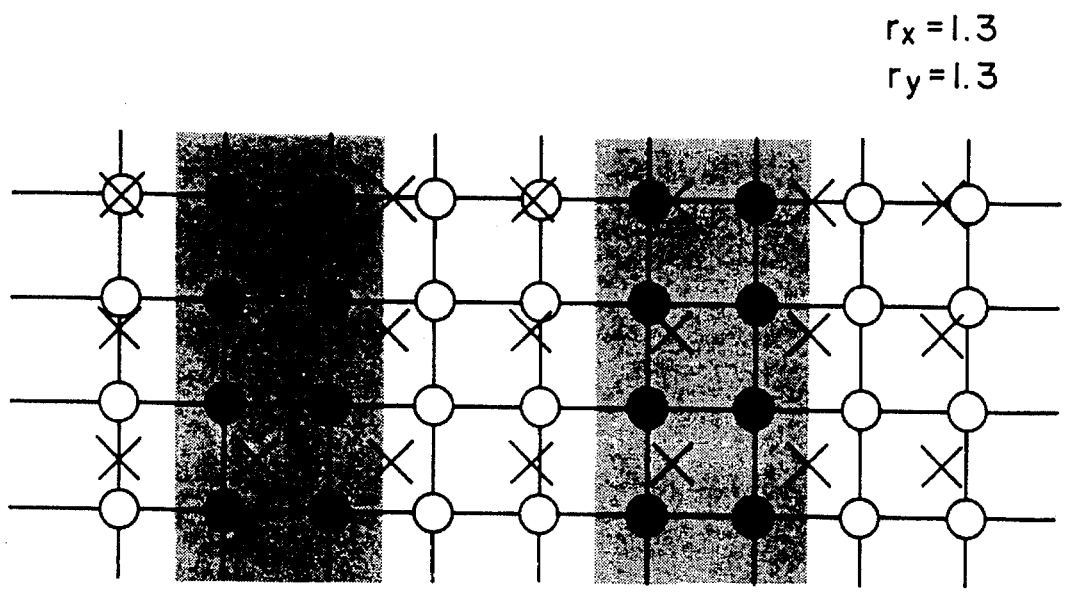
FIGS. 2a and 2b are explanatory diagrams of a scaled image by a conventional resampling system.
Figure 2B:
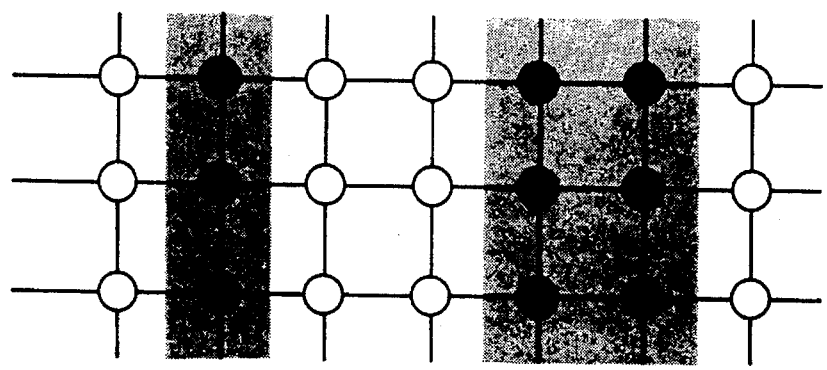
Figure 3:
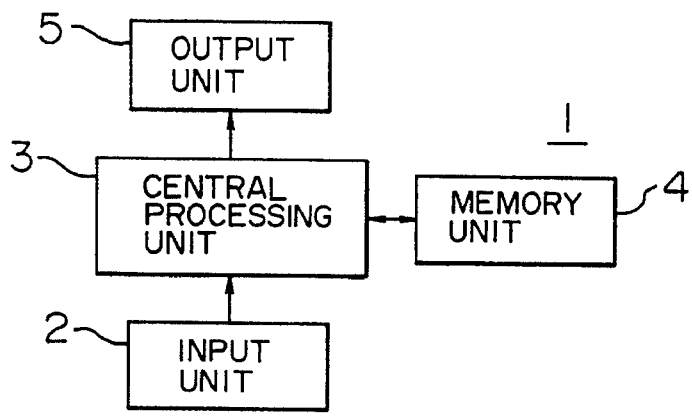
FIG. 3 is a block diagram of an image processing system for executing a method of scaling an image according to the present invention.

FIG. 3 shows a block diagram of an image processing system 1 according to the present invention.

The image processing system 1 is composed of an input unit 2 such as a scanner and a mouse for inputting an original image and a keyboard for inputting a scale factor, a central processing unit 3 functioning as the center of scaling process of the present invention and the process attendant thereupon, a memory unit 4 for storing a program for actuating the central processing unit 3, data of an original image and data of a scaled image, and an output unit 5 such as a CRT for displaying a message for a user, an original image and a scaled image and a printer for printing an original image or a scaled image.

First Embodiment

A first embodiment is that of a scaling method by a resampling system.

An outline of the first embodiment of a scaling method of a binary level image (which has at least one black area and at least one white area) is shown in FIGS. 4a and 4b. The black area shows assemblage of black pixels, and the white area shows assemblage of white pixels. Besides, positional correction in an x-axis direction will be described for simplifying the description, but the same is applied to positional correction in a y-axis direction. Further, the nearest neighbor method is utilized as the method of determining a pixel value, but other methods of determining a pixel value such as the projection method may also be utilized.

In FIGS. 4a and 4b, the scale factor $r_x$ in the x-axis direction is 1/1.3.

FIG. 4a shows a resampling position in case no positional correction is made. When it is assumed that the spacing between neighboring pixels in an original image is "1", the spacing between neighboring resampling positions shows a value $1/r_x=1.3$ which is obtained by dividing "1" by the scale factor $r_x$ in the original image.

Figure 5A:
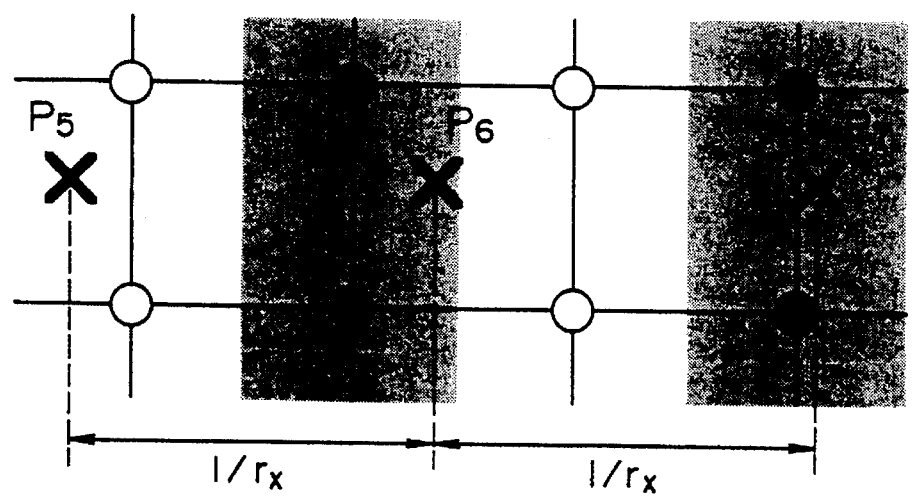
Figure 5B:
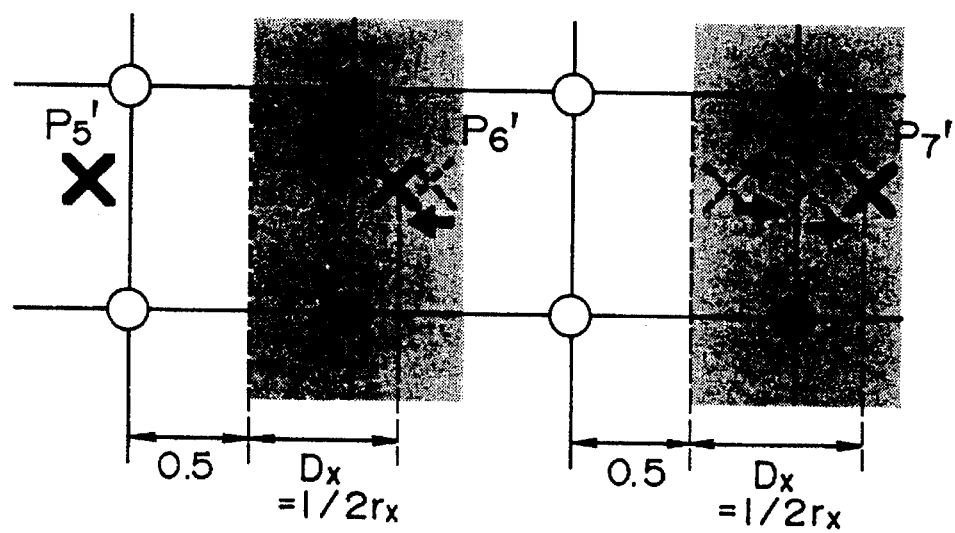

In the nearest neighbor method, a pixel value of a resampling pixel for which the resampling position is located in a region at $-\frac{1}{2}$ to $+\frac{1}{2}$ from a certain lattice point (or pixel position) in an original image is made to coincide with the pixel value of the lattice point (or pixel position). Therefore, when the resampling position is located in a hatched portion in FIG. 4a, the pixel value of a resampling pixel corresponding thereto is blackened, and whitened otherwise. Accordingly, only one pixel corresponding to a resampling position $P_2$ among four resampling pixels corresponding to four resampling positions $P_1$ to $P_4$ shown in FIG. 4a is blackened. FIGS. 5a and 5b are similar figures to FIGS. 4a and 4b, but the original image and the scale factor are different.

In the present embodiment, positional correction of resampling positions is made as described hereunder. Namely, when an original image is scanned from left to right in an x-axis direction, two opposing boundaries, i.e., a white-to-black boundary varying from a white pixel to a black pixel (which is the center of a space between the white pixel and the black pixel and referred to as a "left-handed boundary" hereinafter for convenience' sake) and an inverse black-to-white boundary (which is the center of a space between the black pixel and the white pixel and referred to as a "right-handed boundary" hereinafter for convenience' sake) exist. The resampling position nearest to one of the two opposing boundaries among resampling positions located in respective black areas is moved by a distance $c_x$ so that the distance between the one boundary (the left-handed boundary for instance) and the resampling position nearest to the boundary always shows a constant value $D_x$. Thereafter, the resampling positions neighboring to the resampling position in a direction (a rightward direction for instance) of parting from the boundary (the left-handed boundary for instance) are moved by the same distance $c_x$ one after another. This movement propagates until the resampling position after movement satisfies correction terminating conditions described later.

It is apparent that the constant distance $D_x$ is required to be set to $0 \leq D_x \leq 1$ in order to prevent disappearance of lines. It is due to the fact that the pixel spacing of the original image is set to 1, i.e., normalized (resulting in that the minimal width of the black area becomes 1) that the upper limit value becomes 1. The line in the scaled image becomes thinner as the value of $D_x$ gets bigger. In the present embodiment, $D_x$ is set to $1/(2 \cdot r_x)$ when the scale factor is ½ or above, and to 1 when it is smaller than ½.

Positional correction along the x-axis (in a horizontal direction) will be described in detail with reference to FIGS. 4a and 4b. In the description hereunder, it is assumed that positional correction is made on $B_L$ (a left-handed boundary where white is changed into black) among two boundaries $B_L$ and $B_R$ with respect to the black area when scanning is performed from left to right along the x-axis. Positional correction is made first one the resampling position nearest to the left-handed boundary $B_L$ in the black area. The resampling position $P2$ corresponds to the position described above in FIG. 4a. As shown in FIG. 4b, the resampling position $P_2$ is moved (corrected) so that the distance $D_x$ between the resampling position $P_2$ and the left-handed boundary $B_L$ becomes $D_x=1/(2 \cdot r_x)$. Next, a right-handed neighboring resampling position $P_3$ is also moved (corrected) by the same amount. When the resampling position after correction is within the black area and there is no white area existing between the resampling position after correction and a left-handed neighboring resampling position thereof, positional correction is propagated (continued) further to the secondary right-handed neighboring resampling position so as to also move (correct) a right-handed neighboring resampling position $P_4$ by the same amount.

On the other hand, when the resampling position after correction is located in the white area as shown at the resampling position $P_4$ in FIG. 4b, or when the white area exists between the resampling position after correction and the left-handed neighboring resampling position thereof even if the resampling position is located in the black area as shown at a resampling position $P_7$ in FIG. 5b, correction is terminated without propagating (continuing) positional correction further to a right-handed neighboring resampling position. This is the correction terminating condition.

As described above, since correction is made at the resampling position $P_3$ in FIG. 4b, the resampling position $P_4$ is also corrected. Since the resampling position shown with dotted lines is located within the white area, however, the correction terminating condition is satisfied, the correction is terminated without propagating (continuing) positional correction further to a right-handed neighboring resampling position, and the positionally corrected resampling position is returned to the original position. Since correction is made at a resampling position $P_6$, the resampling position $P_7$ is also corrected in FIG. 5b. However, although the resampling position after correction shown with dotted lines is located within the black area, a white area exists between the resampling position after correction and the left-handed neighboring resampling position. Accordingly, the correction terminating condition is satisfied, the correction is terminated without propagating (continuing) positional correction further to a right-handed neighboring resampling position, and the positionally corrected resampling position is returned to the original position. Furthermore, since the resampling position $P_7$ exists in a second black area different from that for the resampling position $P_6$, the resampling position $P_7$ becomes the resampling position nearest to the left-handed boundary of the second black area among resampling positions located in the second black area. Accordingly, positional correction for setting $D_x=1/(2 \cdot r_x)$ with the resampling position $P_7$ newly adopted as the nearest resampling position is started.

Figure 6A:
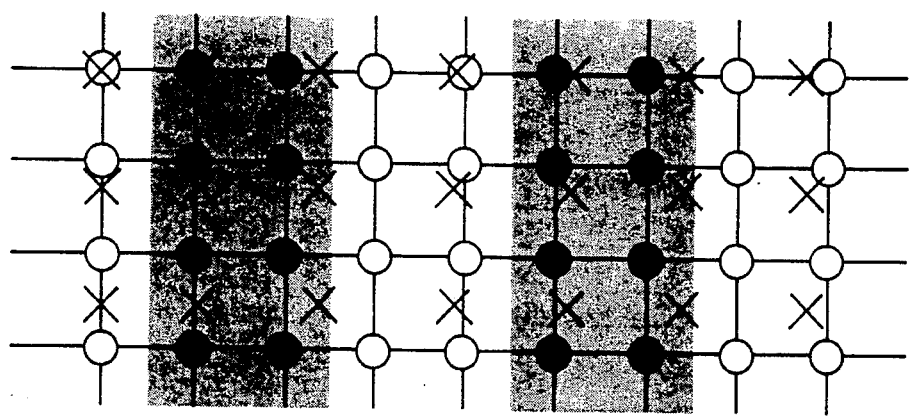
FIGS. 6a and 6b are explanatory diagrams for explaining another scaled image by a resampling system according to the first embodiment of the present invention.
Figure 6B:
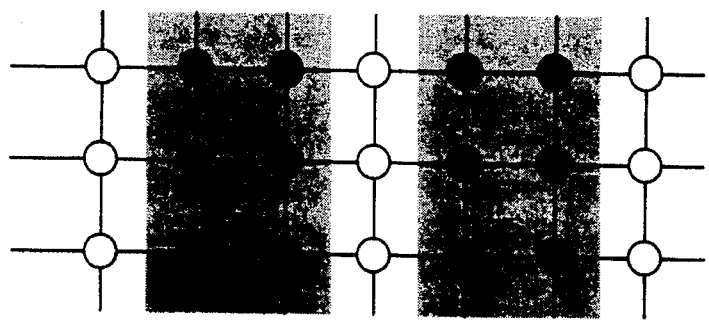

FIGS. 6a and 6b show another example in which variations of line widths are prevented in reduction process of an image. FIG. 6a shows the relationship between an original image and a resampling position or intermediate image after correction. FIG. 6b shows a scaled image. As it is apparent from these figures, two lines which had the same width in the original image have been transformed into two lines also having the same width applied with scaling process in the scaled image.

Next, an example of correction process procedures for a resampling position will be described.

The resampling position is corrected here while scanning from the left upper point (an origin) toward the right lower point of the original image assuming that the x-axis direction is the main scan direction and the y-axis direction is the auxiliary scan direction, but the same is applied when the resampling position is corrected in other sequence than the above.

The correction of the resampling position is made so that the distance between the white-to-black boundary where white is changed into black in the x-axis direction (from left to right) and the resampling position becomes $D_x$ and the distance between the white-to-black boundary where white is changed into black in the y-axis direction (from top to bottom) becomes $D_y$.

A pixel value of the pixel S having coordinates (u, v) for an original image is expressed by $S(u, v)$, a pixel value of a resampling pixel Q having coordinates (X, Y) for a scaled image is expressed by $Q(X, Y)$, coordinates of a resampling position P on the original image before correction is expressed by (x, y), positional correction amounts in the x-axis and y-axis directions are expressed by $c_x$ and $c_y(X)$, and coordinates of a resampling position P' after correction of the resampling pixel Q is expressed by (x', y'). Thus, the following expression is obtained. In this connection, the following should be noted with respect to $c_y(X)$. Since the main scanning is effected in the x-direction, a positional correction amount will be propagated from right to left in the order of the positional correction. However, for propagation of a positional correction amount in the y-direction, it will be necessary to store a correction amount for each column (i.e., for each y-direction coordinate of a resampling position corrected in the x-direction). Accordingly, a positional correction amount in the y-direction will be represented by $c_y(X)$ for each y-direction coordinate.

$$(x',y')=(x+c_x, y+c_y(X))=(i_x'+d_x', i_y'+d_y')$$

Here, $(i_x', i_y')$ show coordinates of a reference lattice point R' for the resampling position P'(x',y') after correction, and $(d_x', d_y')$ show intra-lattice coordinates (which are distances in the x-direction and the y-direction from the reference lattice point R' of the resampling position P' after correction, $c_x=0$, $c_y(X)=0$ indicate that no movement is made, where x'=x and y'=y are obtained. Even in this case, the position is referred to as a resampling position after correction. Besides, the existence of movement may be indicated by using other variables.

The correction of respective resampling positions P is made as follows. First, when there is positional correction $c_x$ propagated to P from left or top in an original image where the resampling pixels of the scaled image are projected, correction terminating process for determining whether the positional correction is to be continued or to be terminated is performed. Next, when positional correction is continued, the pixel value is determined at the resampling position P' after correction. Meanwhile, when correction of P is terminated or when positional correction propagated to P does not exist, determination of a pixel and correction start process are performed at the original resampling position with no correction. It is in a case that the pixel at P is black and correction has not been propagated that correction starting process is performed.

Details of correction terminating process will be described. It is assumed in the following description that coordinates of a pixel of an original image nearest to the present resampling position P are $(n_x, n_y)$. Further, k and m are to be integers, and the inscription of α to β is to show an integer value from α to β.

(1) Correction terminating process in x-axis direction

When positional correction exists ($c_x \neq 0$), it is investigated whether there is a white area between a just left resampling position and the present resampling position, and correction is terminated when affirmative. If negative, correction is continued. Namely, $S(k, n_y)$ is investigated with regard to $k=[x'-1/r_x+0.5]+1$ to $n_x$, and correction is terminated ($c_x=0$) when a white (=0) pixel exists. In case positional correction does not exist ($c_x=0$), nothing is done.

(2) Correction terminating process in y-axis direction

When positional correction exists ($c_y(X) \neq 0$), it is investigated whether there is a white area between a resampling position just above and the present resampling position, and correction is terminated when affirmative. If negative, correction is continued. Namely, $S(n_x, m)$ is investigated with regard to $m=[y'-1/r_y+0.5]+1$ to $n_y$, and correction is terminated ($c_y(X)=0$) if white (=0) pixel exists. In case positional correction does not exist ($c_y(X)=0$), nothing is done.

Next, details of a pixel value determination and correction starting process will be described. Similarly to the foregoing, coordinates of a pixel of an original image nearest to the present resampling position P are assumed to be $(n_x, n_y)$.

(a) If $S(n_x, n_y)$=black (1) and $Q(X, Y)$=black (1), the following process is performed.

(i) When there is no correction ($c_x=0$) in the x-axis direction having propagated to P, positional correction in the x-axis direction is started. The first white pixel is obtained in a leftward direction that the x-coordinate gets smaller from $(n_x, n_y)$. When the x-coordinate is assumed to be $w_x$, the boundary of the black area is at $w_x+0.5$. Therefore, an x-coordinate x' and a new correction amount $c_x'$ of the resampling position P' are expressed as follows.

$x'=w_x+0.5+D_x$ $c_x'=x-x'=x-w_x-0.5-D_x$

When there is correction ($c_x \neq 0$) in the x-axis direction having propagated to P, nothing is done.

(ii) When there is no correction ($c_y(X)=0$) having propagated to P in the y-axis direction, positional correction in the y-axis direction is started. The first white pixel is obtained in a (upward) direction that y-coordinate gets smaller from $(n_x, n_y)$. When the y-coordinate is assumed to be $w_y$, the boundary of the black area is at $w_y+0.5$. Therefore, a y-coordinate y' and a new correction amount $c_y'(X)$ of the resampling position after correction are expressed as follows.

$y'=w_y+0.5+D_y$ $c_y'(X)=y-y'=y-w_y-0.5-D_y$

When there is correction ($c_y(X) \neq 0$) having propagated to P in the y-axis direction, nothing is done.

(b) When $S(n_x, n_y)$=white (0), it is investigated whether there is start of a new black area between left, upper and left upper resampling positions and the present resampling position, i.e., a left-handed boundary or an upper boundary, and Q(X, Y) is blackened (1) if any and whitened (0) otherwise in order to preserve thin lines.

It is investigated whether there are k and m which satisfy: $S(k-1, n_y)$=white (0) and $S(k, n_y)$=black (1) or $S(n_x, m-1)$=white (0) and $S(n_x, m)$=black (1) or $S(k-1, m-1)$=white (0), $S(k, m-1)$=white (0), $S(k-1, m)$=white (0) and $S(k, m)$=black exist in a range of $k=[x'-1/n_x+0.5]+1$ to $n_x$ and $m=[y'-1/r_y+0.5]+1$ to $n_y$, and Q(X, Y)=black (1) is effected if any, and Q(X, Y)=white (0) is effected if none.

Figure 7:
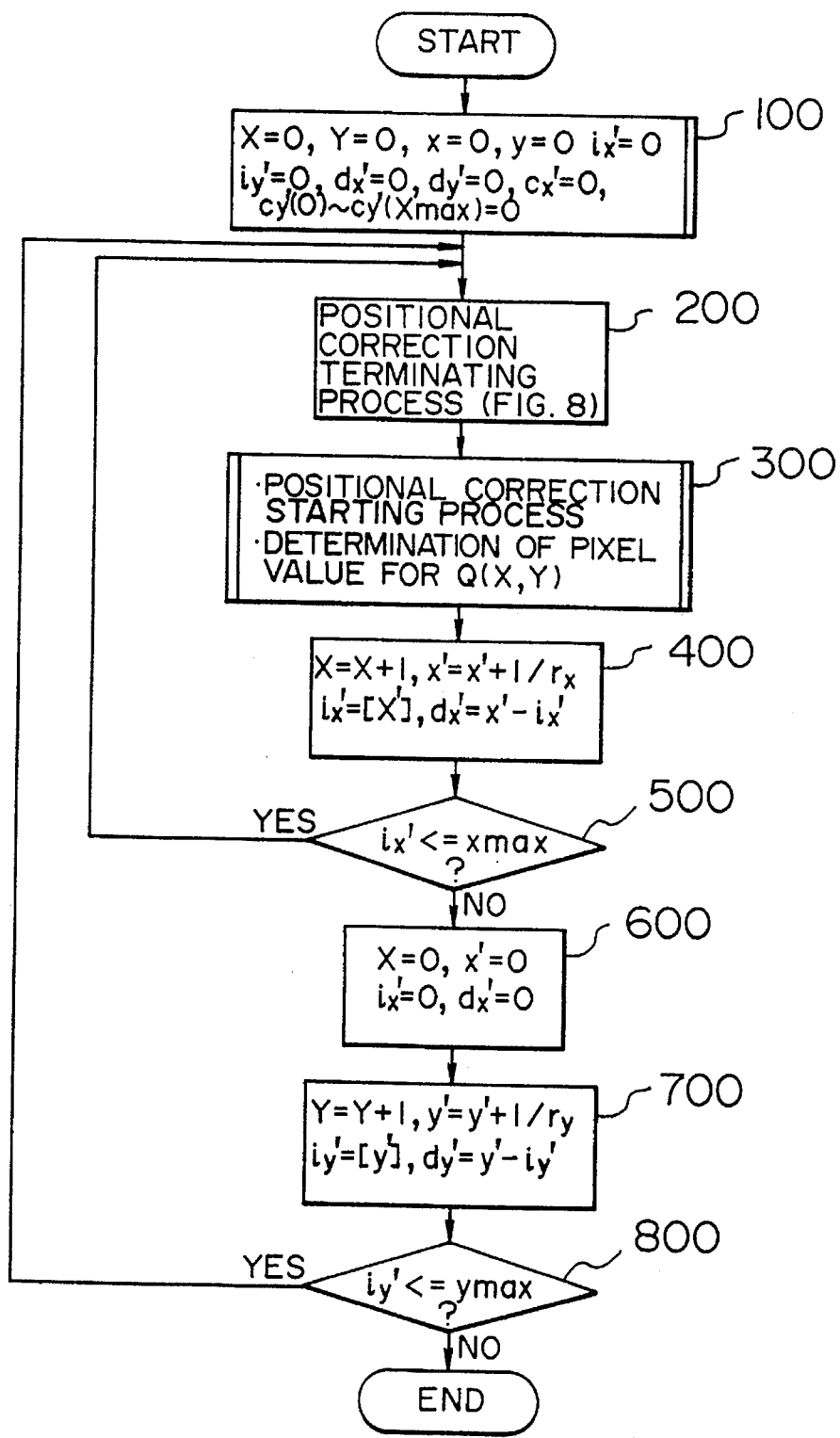
FIG. 7 is a flow chart of scaling process of an image according to the first embodiment of the present invention.

FIG. 7 shows a flow chart of positional correction process.

Step 100: Coordinates (X, Y) of a resampling pixel are initialized to "0". Namely, the resampling pixel is adopted as an origin. Further, coordinates (x', y') of the resampling position P', coordinates ($i_x'$, $i_y'$) of a reference lattice point which are the coordinates of an upper left pixel R' among lattice points surrounding the resampling position P', and intra-lattice coordinates ($d_x'$, $d_y'$) of the resampling position P' are initialized to "0". Furthermore, new positional correction amounts $c_x'$ and $c_y'(X)$ (X=0~Xmax, Xmax being a rightwardmost x-coordinate) are initialized to "0".

Step 200: Correction terminating process is performed. This correction terminating process will be described later with reference to FIG. 8.

Step 300: Correction starting process and determining process of a pixel value are performed. These correction starting process and determining process of a pixel value will be described later with reference to FIG. 9.

Step 400: The resampling pixel to be subjected to correction is advanced to the right by 1. The x-coordinate of the resampling position, the x-coordinate of the lattice point and the x-coordinate of the intra-lattice coordinates are renewed conforming thereto.

Step 500: (Step 200) to (Step 500) are repeated until the x-coordinate of the lattice point reaches the right end (xmax), and the process is proceeded to (Step 600) thereafter.

Step 600: The resampling pixel to be subjected to correction is returned to the left end. The x-coordinate of the resampling position P, the x-coordinate of the lattice point and the x-coordinate of the intra-lattice coordinates and positional correction amount $c_x$ in the x-direction are returned to "0".

Step 700: The resampling pixel to be subjected to correction is advanced downwards by 1. The y-coordinate of the resampling position, the y-coordinate of the lattice point and the y-coordinate of the intra-lattice coordinates are renewed conforming thereto.

Step 800: (Step 200) to (Step 800) are repeated until the y-coordinate of the lattice point reaches the lower end (ymax), and the process is terminated thereafter.

Figure 8:
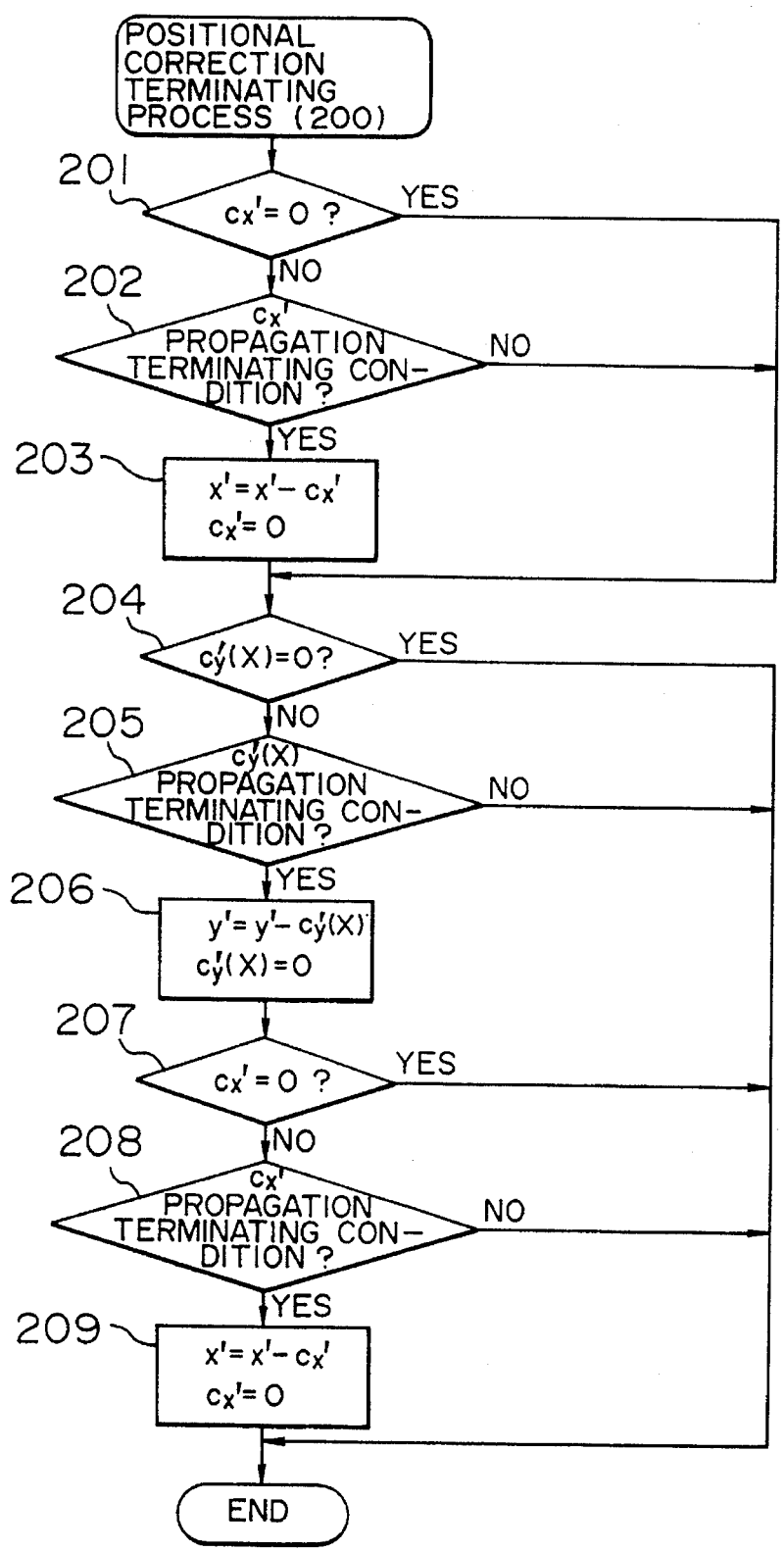
FIG. 8 is a detailed flow chart of positional correction terminating process according to the first embodiment of the present invention.

Next, the correction terminating process 200 will be described in detail with reference to a flow chart in FIG. 8.

Step 201: It is investigated whether positional correction in the x-axis direction applied to the resampling position P' does not exist ($c_x$=0) or exists ($c_x \neq 0$), and the process is advanced to a process 204 if negative and to a step 202 if affirmative.

Step 202: It is determined whether the correction terminating condition in the x-axis direction is satisfied or not. When the condition is not satisfied, positional correction is propagated to a right neighboring resampling position and the process is proceeded to the step 204, and, when the condition is satisfied, the process is proceeded to a step 203.

Step 203: End process of positional correction in the x-axis direction is performed. Namely, positional correction is prevented from propagating to a right neighboring resampling position, and the correction $c_x$ applied to the resampling position P' is returned to 0.

Step 204: It is investigated whether positional correction in the y-axis direction applied to the resampling position P' does not exist ($c_y(X)$=0) or exists ($c_y(X) \neq 0$). The present correction terminating process is brought to an end when negative, and the process is advanced to a step 205 when affirmative.

Step 205: It is determined whether the correction terminating condition in the y-axis direction is satisfied. When negative, the positional correction is propagated to a lower neighboring resampling position and the present correction terminating process is brought to an end, and when affirmative, the process is advanced to a step 206.

Step 206: End process of positional correction in the y-axis direction is performed. Namely, the positional correction is prevented from propagating to a lower neighboring resampling position and the correction $c_y(X)$ applied to the resampling position P' is returned to 0.

Step 207: It is investigated whether the positional correction in the x-axis direction does not exist ($c_x$=0) or exists ($c_x \neq 0$), and the correction terminating process is brought to an end when negative and the process is advanced to a step 208 when affirmative.

Step 208: It is determined whether the correction terminating condition in the x-axis direction is satisfied or not, and the correction terminating process is brought to an end when negative and the process is advanced to a step 209 when affirmative.

Step 209: End process of positional correction in the x-axis direction is performed.

Figure 9:
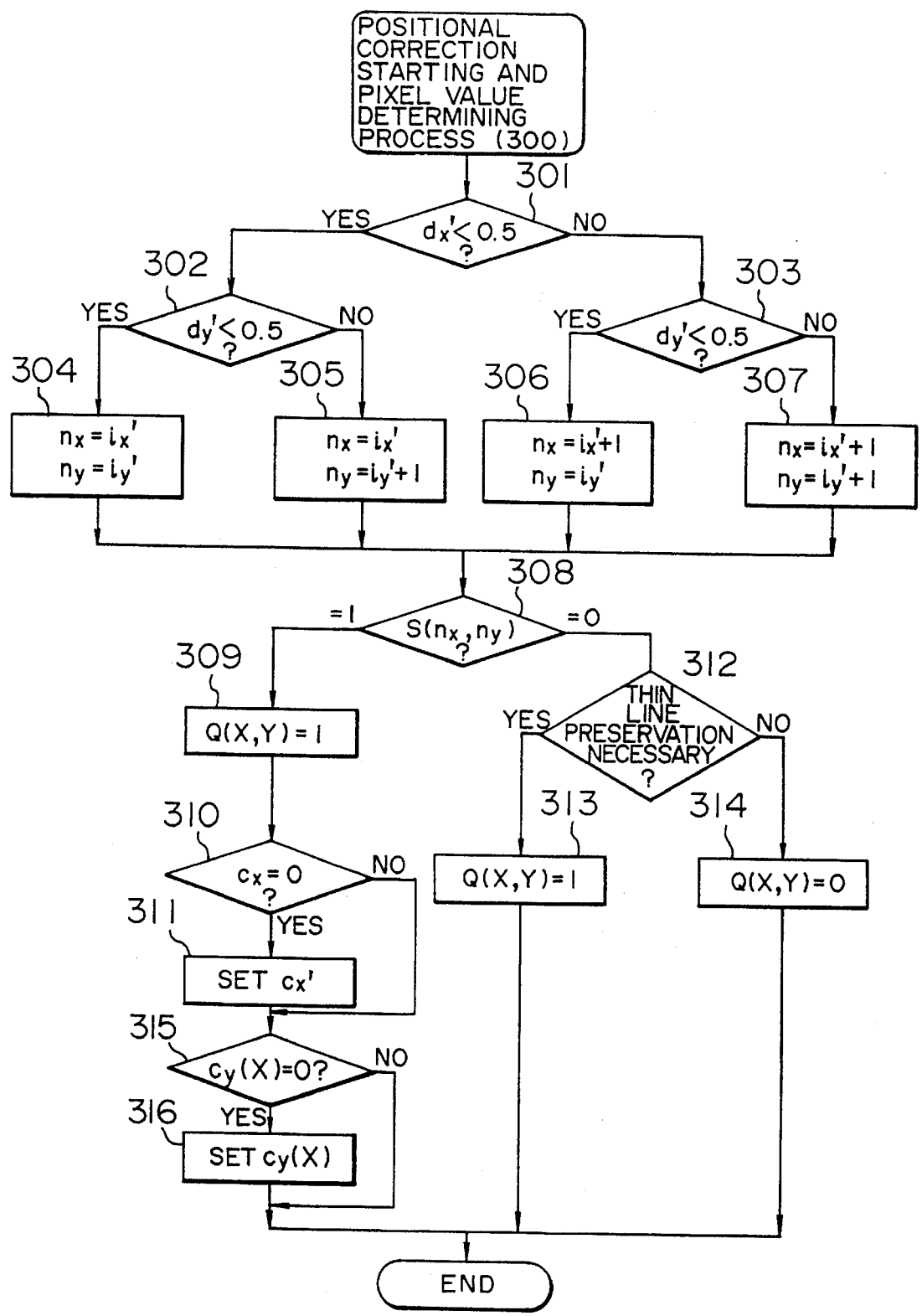
FIG. 9 is a detailed flow chart of positional correction start and pixel value determination process of the first embodiment of the present invention.

Next, the correction starting process and a pixel value determining step 300 will be described in detail with reference to a flow chart in FIG. 9.

Step 301 to Step 303: Classification is made into following four cases depending on the values of $d_x$ and $d_y$.

a) $d_x'$<0.5 and $d_y'$<0.5
b) $d_x'$<0.5 and $d_y' \geq 0.5$
c) $d_x' \geq 0.5$ and $d_y'$<0.5
d) $d_x' \geq 0.5$ and $d_y' \geq 0.5$ Step 304 to Step 307: The coordinates of a lattice point (a reference lattice point) nearest to the resampling position P' are set to ($n_x$, $n_y$).

Step 308: A pixel value $S(n_x, n_y)$ of the coordinates ($n_x$, $n_y$) is investigated. In case of black (=1), the process is advanced to a step 309, and, in case of white (=0), the process is advanced to a step 312.

Step 309: A pixel value Q(X, Y) of the resampling pixel is determined to black (=1).

Step 310: It is investigated whether positional correction in the x-axis direction applied to the resampling position P' does not exist ($c_x$=0) or exists ($c_x \neq 0$). When $c_x \neq 0$, the correction amount $c_x$ is propagated to a right neighboring resampling position and the process is advanced to step 315. When $c_x$=0, the process is advanced to a step 311.

Step 311: A new positional correction amount $c_x'$ in the x-axis direction is computed and set in accordance with item (a) of the pixel value determination and correction starting process described previously.

Step 312: It is investigated whether k and m which satisfy the conditions stated in item (b) of the pixel value determination and correction starting process described previously exist or not, and the process is proceeded to a step 313 when affirmative and the process is proceeded to a step 314 when negative.

Step 313: The pixel value Q(X, Y) of the resampling pixel is determined to black (=1).

Step 314: The pixel value Q(X, Y) of the resampling pixel is determined to white (=0).

Step 315: It is investigated whether positional correction in the y-axis direction applied to the resampling position P' does not exist ($c_y(X)$=0) or exists ($c_y(X) \neq 0$), and the correction amount $c_y(X)$ thereof is propagated to a lower neighboring resampling position when affirmative and the present correction starting process and the pixel value determining process are terminated, and the process is proceeded to a step 316 when negative.

Step 316: A new positional correction amount $c_y(X)'$ in the y-axis direction is computed and set in accordance with the item (a) of the pixel value determination and correction starting processes described previously.

Figure 10:
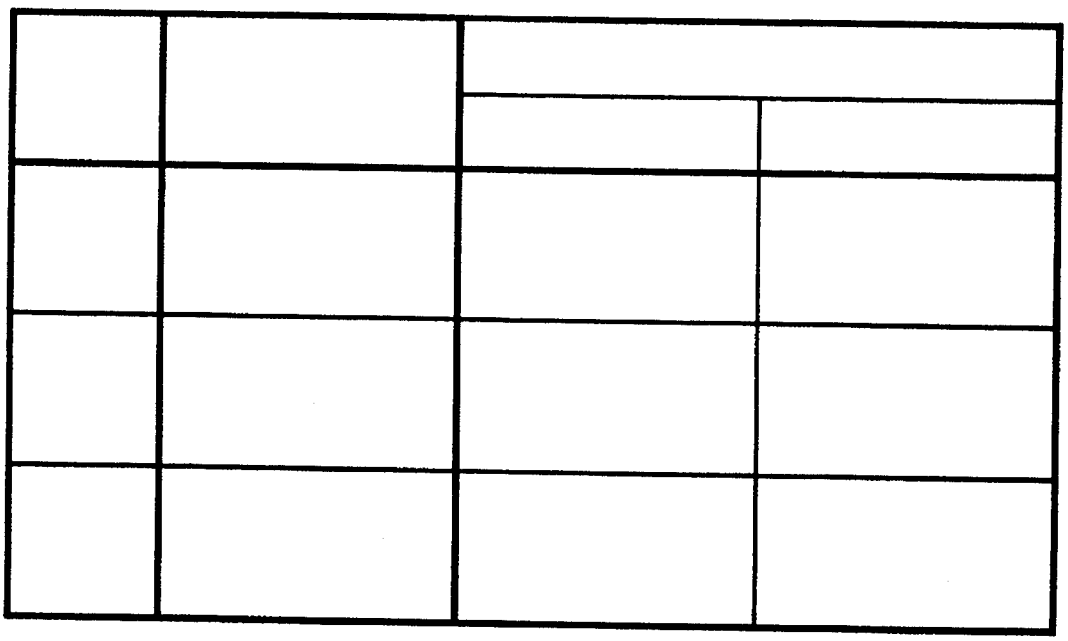
FIG. 10 is an illustration of an original image.
Figure 11:
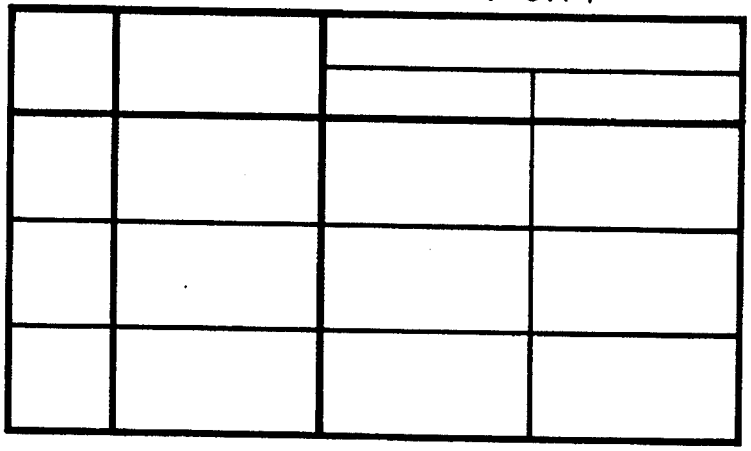
FIG. 11 is an illustration of a scaled image obtained as a result of processing the image in FIG. 10 according to the first embodiment of the present invention.
Figure 12:
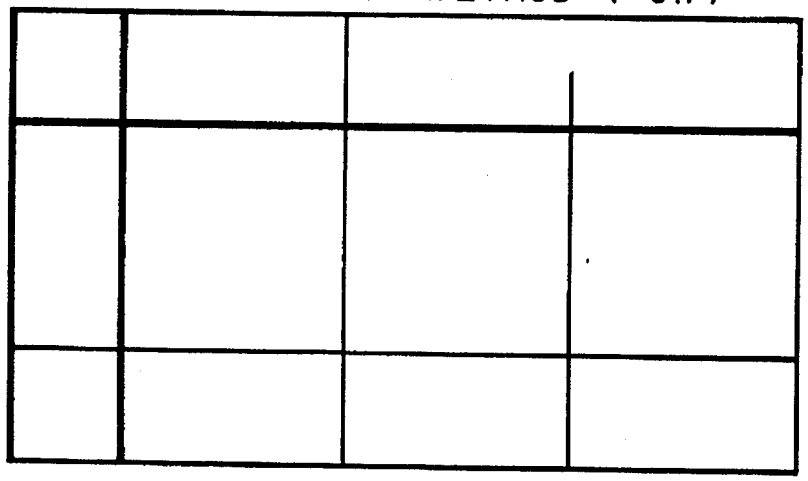
FIG. 12 is an illustration of a scaled image obtained as a result of processing the image in FIG. 10 by a conventional projection method.
Figure 13:
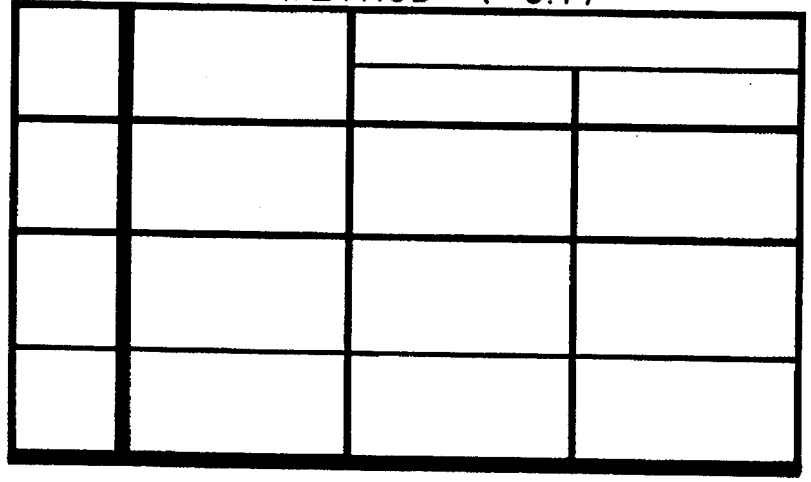
FIG. 13 is an illustration of a scaled image obtained as a result of processing the image in FIG. 10 by a conventional logical OR method.

An example of an original image is shown in FIG. 10. The processed result by the present embodiment is shown in FIG. 11. Further, FIG. 12 shows the processed result by the conventional nearest neighbor method, and FIG. 13 shows the processed result by the conventional logical OR method for the purpose of comparison. The reduction factor is 0.7, and the line widths of the original image are two pixels and one pixel.

As it is understood from FIG. 11, according to the scaling method of the present embodiment, a plurality of lines each having a certain width in the original image are all transformed into the same width in accordance with the scale factor (a line two pixel wide into a line two pixel wide, and a line one pixel wide into a line one pixel wide), and neither disappearance of lines nor variations of width occur. On the other hand, as it is understood from FIG. 12, a line one pixel wide is transformed into lines one pixel wide and 0 pixel wide (i.e., disappearance), and a line two pixel wide is converted into lines two pixel wide and one pixel wide by the conventional nearest neighbor method. Further, as it is understood from FIG. 13, a line two pixel wide is transformed into lines three pixel wide and two pixel wide and lines one pixel wide are transformed into lines one pixel wide and two pixel wide by the conventional logical OR method. When disappearance of thin lines or variations of line widths occur in such a manner, the contents intended to express by the difference in the line width are lost, and the quality is largely deteriorated in a table or the like in which lines are important. According to the embodiment, neither disappearance of thin lines nor variations of line widths occur, thus making it possible to improve the image quality than before.

Second Embodiment

A second embodiment is that of a scaling method not by the resampling system, but by a coordinates conversion system of a pixel run. Besides, the pixel run means an array of pixels having the same pixel value arranged continuously in a certain fixed direction (vertically, horizontally or the like).

In the scaling method according to the coordinates conversion system of a pixel run, a start pixel and an end pixel of a black pixel run in a horizontal direction in the original image are detected, positions on the scaled image (processed image) corresponding to the start pixel and the end pixel are obtained in accordance with the scale factor, and a black pixel run in the scaled image is obtained.

When it is assumed that the x-coordinates of the start pixel and the end pixel of the black pixel run in the original image are $x_s$ and $x_e$ and the scale factor is $r_x$, the x-coordinates $X_s$ and $X_e$ of the start pixel and the end pixel of the black pixel run in the scaled image are expressed as follows.

$$X_s=[x_s \cdot r_x+C1]$$

$$X_e=[x_e \cdot r_x+C1]$$

Where, C1 is a parameter showing a value within a range of $0 \leq C1 \leq 1.0$, so that $(x_s \cdot r_x+C1)$ and $(x_e \cdot r_x °C1)$ are chopped at their fractional parts C1=0 and are rounded to nearest at C1=0.5. Thus, symbol [] represents chopping or disregard of the fractional part of a number located in the symbol []. An intermediate image is produced after performing this process in the x-axis direction. Then, a scaled image is obtained by also performing the process in the y-axis direction in a similar manner.

Figure 14A:
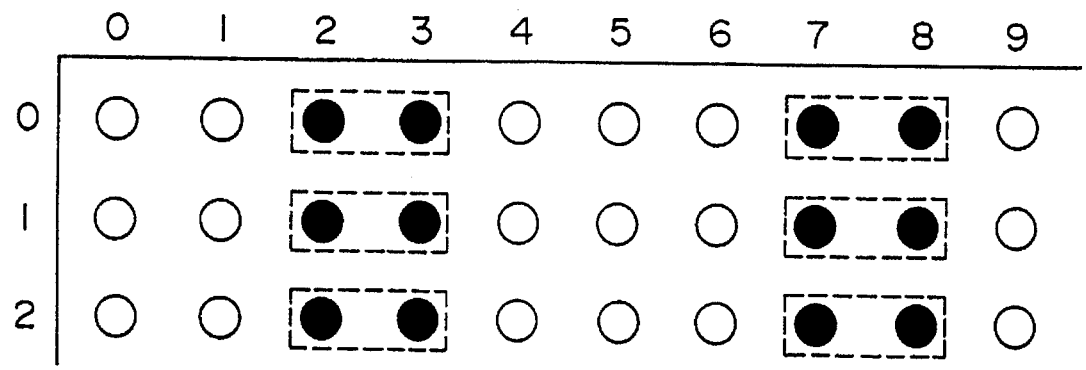
FIGS. 14a and 14b are explanatory diagrams for explaining a conventional scaling process of a pixel run of a coordinate transformation system.
Figure 14B:
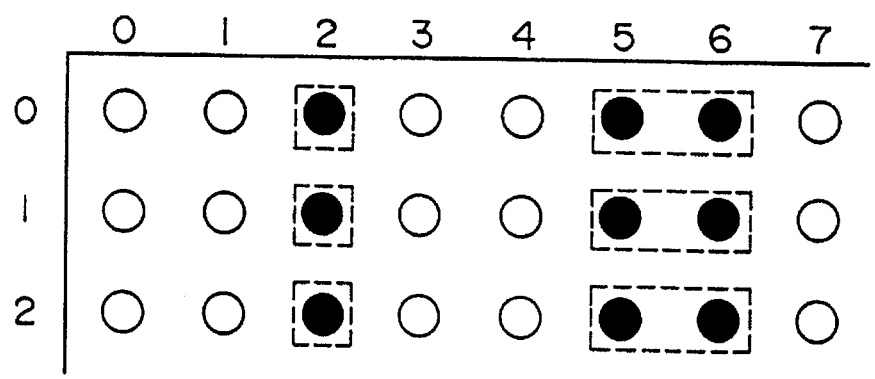

FIG. 14a shows an example of an original image. FIG. 14b shows an example of a scaled image processed on the original image shown in FIG. 11a assuming that $r_x1/1.3$ and C1=0.5.

According to the scaling method by the coordinates conversion system of a pixel run, it is possible to process more simply than by the resampling system, consequently at a high speed. However, the image quality is generally degraded lower than the resampling system. Further, although no disappearance of thin lines occurs, variations of line widths happen as it is realized from FIG. 11b.

Accordingly, in the second embodiment of the present invention, line width variation is prevented by correcting the coordinates of the end pixel of the pixel run in the scaled image. This corresponds to the correction of the resampling position in the first embodiment.

The coordinates of the end pixel of the black pixel run in the scaled image are obtained by adding a width computed by multiplying the width of the pixel run in the original image by the scale factor to the coordinates of the start pixel of the black pixel run in the scaled image.

The width w of the pixel run in the original image is expressed as $w=(x_e-x_s+1)$. The width W of the pixel run in the scaled image is expressed as $W=w \cdot r_x$.

Thus, the coordinates $X_e$ of the end pixel of the pixel run in the scaled image is expressed as follows.

$$X_e=X_s+W-1=X_s+[(x_e-x_s+1)\cdot r_x+C2]-1$$

Here, C2 is a parameter similar to C1 mentioned above, and may either be a value same as C1 or a value different therefrom.

Figure 15A:
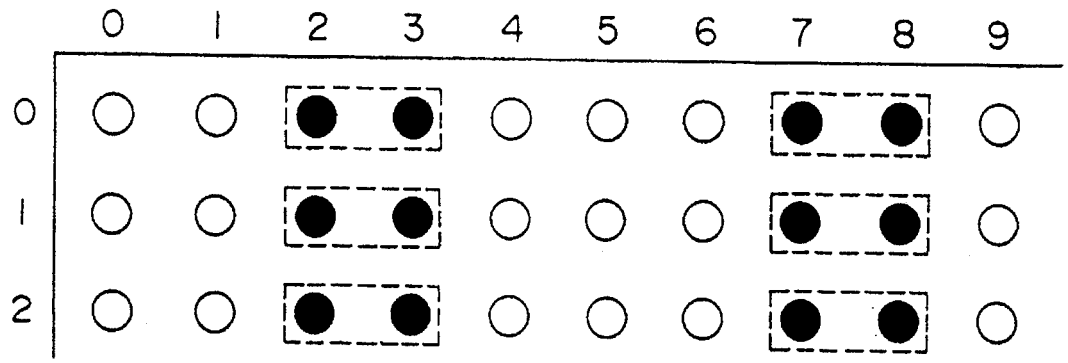
FIGS. 15a and 15b are explanatory diagrams for explaining scaling process of a pixel run by a coordinate transformation system according to a second embodiment of the present invention.
Figure 15B:
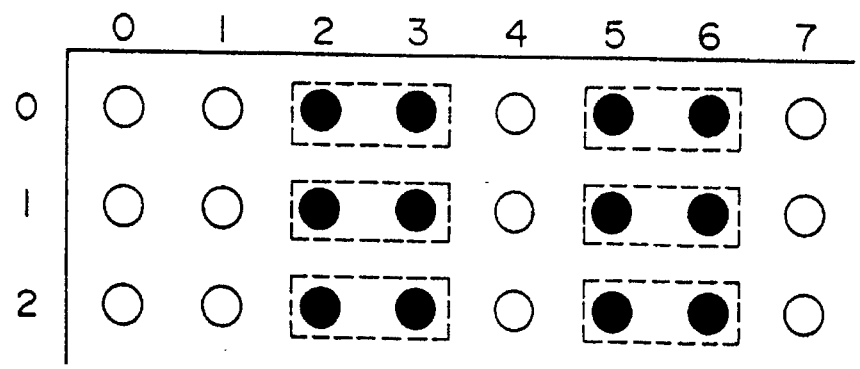

FIG. 15a shows an example of an original image similar to that shown in FIG. 14a. FIG. 15b shows an example of a scaled image processed on the original image in FIG. 15a assuming the scale factor $r_x=1/1.3$ and C2=0.5. As it is realized from FIGS. 15a and 15b, it is possible to prevent variations of line widths according to the second embodiment.

Computational expressions of the start pixel and the end pixel of the pixel run in the scaled image are collected as follows.

$$X_s=[x_s \cdot r_x+C1]$$

$$X_e=X_s+[(x_e-x_s+1)\cdot r_x+C2]-1$$

Where, C1 and C2 are parameters showing a value at 0 or above and less than 1.0.

A processed image is obtained by performing similar process in the y-axis direction, too.

Third Embodiment

A third embodiment is that of a scaling method by a coordinates conversion system of a pixel run similarly to the second embodiment, but the coordinates of a start pixel and an end pixel of a pixel run are obtained by converting the coordinates of the white-to-black boundary (a left-handed boundary) in an original image.

The coordinates of the white-to-black boundary (the left-handed boundary) in the original image are located on the left of the start pixel $x_s$ of the black pixel run by 0.5, and are Y-0.5. Now, when it is assumed that the coordinates of the white-to-black boundary in the scaled image are $(x_s-0.5)\cdot r_x$ multiplied by the scale factor $r_x$, the start pixel $X_s$ of the black pixel run in the scaled image becomes:

$$X_s=\text{round-up }\{(x_s-0.5)\cdot r_x\}$$

since it is located on the right of the white-to-black boundary. Here, round-up {} is a function of obtaining $X_s$ as an integer by round-up.

Similarly, the coordinates of the black-to-white boundary (a right-handed boundary) in the original image are $(x_e+0.5)$. Further, the coordinates of the end pixel of the black pixel run in the processed image are $[(x_e+0.5) \cdot r_x]$, but this is in a state with no correction, and line width variation occurs. So, the coordinates $X_e$ of the end pixel of the black pixel run in the processed image are obtained by adding the width computed by multiplying the width of the pixel run in the original image by the scale factor to the coordinates of the white-to-black boundary (the left-handed boundary) in the scaled image so as to obtain the black-to-white boundary and by computing the coordinates of the pixel on the left side thereof.

The coordinates of the white-to-black boundary (the left-handed boundary) in the scaled image are $X_s-0.5$. The width of the black pixel run in the scaled image is $(x_e-x_s+1) \cdot r_x$. Therefore, the coordinates of the black-to-white boundary (the right-handed boundary) in the scaled image are $X_s-0.5+(x_e-x_s+1) \cdot r_x$. So, the coordinates $X_e$ of the end pixel of the black pixel run become as follows.

$$X_e=[X_s-0.5+(x_e-x_s+1) \cdot r_x]$$

Computational expressions of the start pixel and the end pixel of a pixel run in the processed image according to the third embodiment are collected as shown hereunder.

$$X_s=\text{round-up}\{(x_s-0.5) \cdot r_x\}$$

$$X_e=[X_s-0.5+(x_e-x_s+1) \cdot r_x]$$

Fourth Embodiment

In the second embodiment and the third embodiment described above, after an image processed with respect to the x-axis direction is obtained, similar process is performed in the y-axis direction on the image resulting from the process, thus obtaining a scaled image. In this case, a memory for once storing the image resulting from the process in the x-axis direction becomes necessary. In the fourth embodiment, the scaled result on the whole original image is obtained by processing in the y-axis direction simultaneously with processing in the x-axis direction without producing an image processed with respect to the x-axis direction. With this, it is possible to realize a high speed and also to reduce required capacity of the memory.

A black area of an image processed in the x-axis direction can be divided into rectangles. The dividing method is arranged so that a part or the whole of an upper boundary and a lower boundary of a rectangle produced by division becomes the upper boundary and the lower boundary of the rectangle before division. There are a plurality of such dividing methods, but any method may be adopted. However, a smaller number of rectangles produced by division is more advantageous in point of process speed. In the embodiments described hereinafter, it is arranged so that all of the dividing lines are vertical, the divided rectangles are not overlapped one another, and the number of rectangles produced by division becomes the minimal. When the rectangle thus divided is outputted by also scaling in the y-axis direction by coordinates computation same as the coordinates computation of the pixel run in the x-axis direction, expected results can be obtained. When a course of processing an image line by line is considered, it is possible to trace the rectangle in the y-axis direction by means of a table for storing x coordinates of start and end pixels and y coordinates of start pixel with this information on rectangles.

When the rectangle is terminated, the rectangle image is outputted after scaling process in the y-axis direction and deleted out of the table. With this, it is possible to obtain the result of scaling the image processed in the x-axis direction also in the y-axis direction without producing the image once.

The details of the process will be described. The table for rectangle information is structured as shown in FIG. 16, and x coordinates of start and end pixels of a rectangle scaled in the x-axis direction, y coordinates of start pixels of a rectangle, and a connection flag indicating whether there is a connecting pixel run thereunder are stored. Two tables, one being a primary table which stores rectangle information up to a line just above what is being presently processed and the other being a secondary table for storing rectangle information renewed by the process, are used. A pixel run in the x-axis direction is detected for the first line of the image, and scaling is performed by the computation system described previously. This is the start of a rectangle to be traced, and x coordinates of start and end pixels and y coordinates of start pixel of the pixel run and no connection (off) as an initial value of the connection flag are stored in the table. This process is performed on all the pixel runs in the first row. Next, the pixel run is detected with respect to the second row. When one pixel run is detected, scaling process is performed, and it is investigated thereafter whether there is a rectangle connecting to a pixel run after scaling process (which is referred to hereinafter as an attending pixel run) in the primary table or not by using the table of rectangle information. In case there is no rectangle to be connected, it is registered in the secondary table similarly to the process of the first row. In case there is a rectangle to be connected, a connection flag showing that a pixel run to connect to the rectangle exists are set to connection (on).

The connecting state between the attending pixel run and the rectangle includes three portions, i.e., (a) a portion of the attending pixel run where a rectangle exists thereabove, (b) a portion of the attending pixel run where no rectangle exists thereabove and (c) a rectangle portion where no pixel run exists thereunder, and it is possible to divide into nine cases as shown in FIGS. 19a to 19i depending on the existence of these portions. Since the portion (c) is a portion where continuation in the y-axis direction is terminated, the rectangle in this portion is scaled in the y-axis direction and the resulted rectangle is outputted. The portion (a) is stored in the secondary rectangle information table so as to trace successively. At this time, y coordinates of start pixel shows a value in the original table. The portion (b) is a portion to newly start tracing, and is entered in the secondary table for tracing. What differs from the case (a) is that y coordinates of start pixel are those of the row being processed presently.

The case of FIG. 19i will be described in detail in FIGS. 20a to 20c. The coordinates of the start and end pixels of an attending pixel run 10 are $x_s$ and $x_e$ and x coordinates of start and end pixels of a connecting rectangle in the table are $X_{1s}$ and $X_{1e}$ and y coordinates of start pixel is $Y_{1s}$. First, the connection flag of this rectangle is set to connection (on). Next, upper left coordinates $(X_e+1, y_{1s})$ and lower right coordinates $(X_{1e}, h_y-1)$ of a rectangle in the portion corresponding to (c) are outputted after being scaled in the y-axis direction. In the figure, the results of scaling process of $Y_{1s}$ to $h_y-1$ are expressed by $Y_{1s}$ to $Y_e$. x coordinates $X_{1s}$ and $X_e$ of start and end pixels and y coordinate $y_{1s}$ of start pixel are entered as rectangle information of a portion corresponding to (a), and x coordinates $X_s$ and $X_{1s}-1$ of start and end pixels and y coordinate by of start pixel are entered as rectangle information of a portion corresponding to (b) in a new table.

Although only a case of connecting one pixel run to a rectangle is shown in FIGS. 19a to 19i, the connecting states can be similarly divided into portions (a), (b) and (c) in case a plurality of pixel runs are connected to one rectangle, etc., and the process is performed in a similar manner. This process is performed on all the pixel runs in that row. After the process is completed, rectangles in the table that have no connection with the pixel run are investigated by the connection flag, which are outputted after being scaled in the y-axis direction. Then, a third row is processed using the new rectangle information table produced by the process of this row. This process is repeated thereafter. In the process of the last row, the portions (a) and (b) are also outputted after being scaled in the y-axis direction since there is no pixel run following thereunder. Through the process described above, it is possible to realize scaling in both x-axis and y-axis directions only by the process of the pixel run in the x-axis direction.

Figure 17:
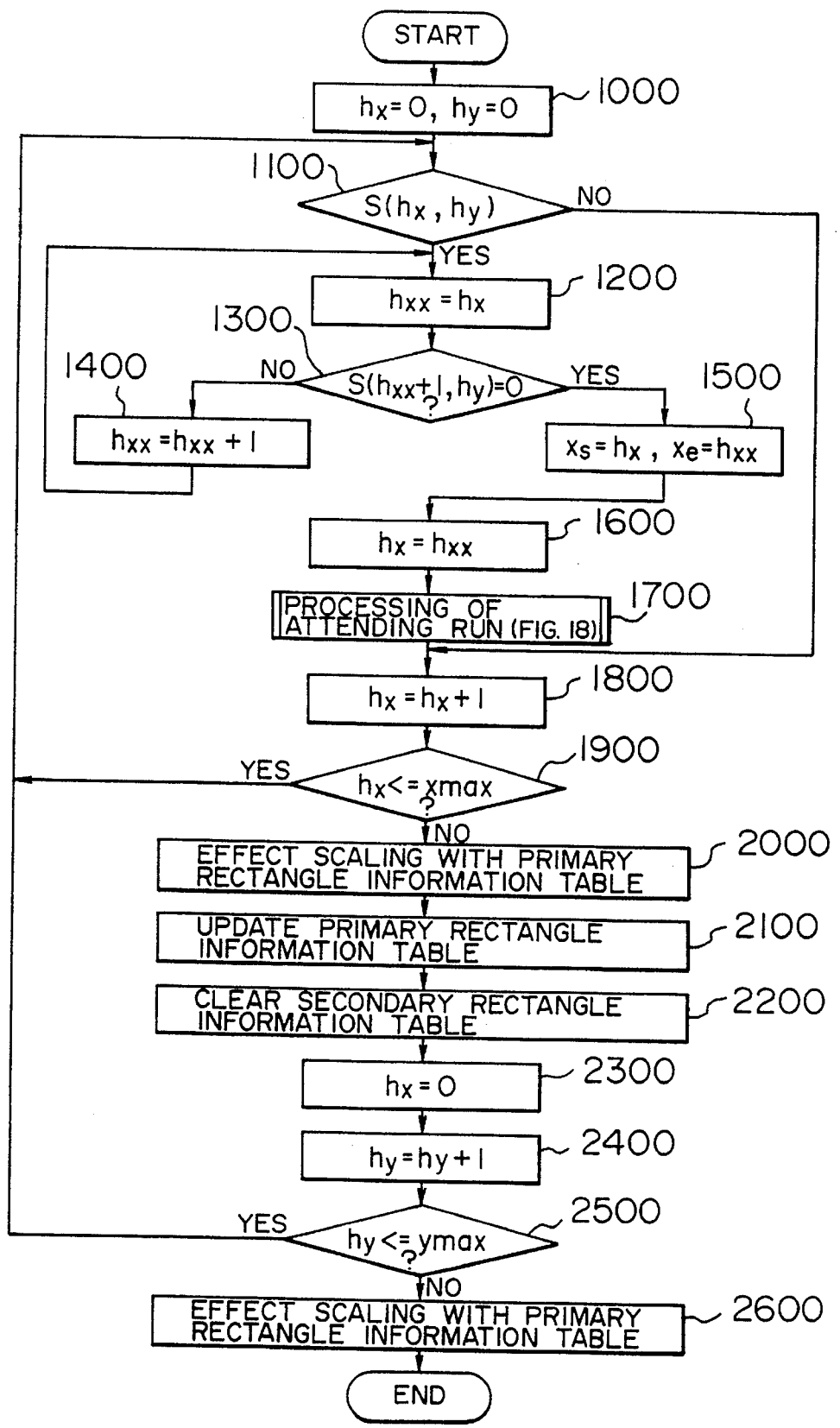
FIG. 17 is a process flow chart according to a fourth embodiment of the present invention.

FIG. 17 shows a process flow chart of the fourth embodiment.

Step 1000: Variables $h_x$ and $h_y$ showing coordinates of a pixel in an original image are initialized to 0.

Step 1100: A pixel value $S(h_x, h_y)$ of a pixel S having coordinates $(h_x, h_y)$ for the original image is investigated, and the process is proceeded to a step 1200 in case of black (=1) and the process is proceeded to a step 1800 in case of white (=0).

Step 1200: A variable $h_{xx}$ for searching an end pixel of a black pixel run is initialized to $h_x$.

Step 1300: The value of $S(h_{xx}, h_y)$ is investigated, and the process is proceeded to a step 1400 in case of black (=1) and the process is proceeded to a step 1500 in case of white (=0).

Step 1400: The variable $h_{xx}$ is renewed to $h_{xx}+1$, and the process is returned to the step 1200.

Step 1500: Coordinates $x_s$ and $x_e$ of the start pixel and the end pixel of the black pixel run are set to $h_x$ and $h_{xx}$, respectively. In other words, the black pixel run is detected and coordinates $x_s$ and $x_e$ of the start pixel and the end pixel thereof are obtained by the step 1100 through the step 1500 described above.

Step 1600: The variable $h_x$ is advanced up to the end pixel of the detected black pixel run.

Step 1700: The detected black pixel run is adopted as an attending pixel run, and the attending pixel run is applied with scaling process. This process will be described later with reference to a flow chart shown in FIG. 18.

Step 1800: The variable $h_x$ is renewed to $h_x+1$ as a starting point for searching a secondary black pixel run.

Step 1900: The step 1100 through the step 1900 are repeated until the variable $h_x$ reaches the right end (xmax) of the original image. When the right end (xmax) of the original image is reached, the process is proceeded to a step 2000 since the process of one row portion is completed.

Step 2000: At a point of time when the process of one row portion is completed, process of information stored in the primary reference rectangle information table is performed. First, information on a rectangle in which continuation in the y-axis direction is terminated in the previous row (the row one row ahead) is processed. Namely, when some connection flags in the rectangle in the primary rectangle information table (hereinafter referred to as a "primary table" for the sake of simplicity) are "non-connecting", tracing in the y-axis direction is terminated, and a rectangle with $(x_{1s}, y_{1s})$ as a left upper vertex and $(X_e+1, h_y-1)$ as a lower right vertex is scale-processed, and processed unit rectangle information is generated.

Step 2100: The contents of a secondary rectangle information table (hereinafter referred to as a "secondary table" for the sake of simplicity) are copied in the primary table.

Step 2200: The contents of the secondary table are cleared.

Step 2300: The variable $h_x$ is initialized to "0".

Step 2400: The variable by is renewed to $h_y+1$.

Step 2500: The step 1100 through the step 2500 are repeated until the variable $h_y$ reaches the lower end (ymax) of the original image. When $h_y$ reaches the lower end (ymax) of the original image, the process is proceeded to a step 2600 since there is no secondary row.

Step 2600: The end y coordinate is set to $h_y$ with respect to information on all the processed rectangles stored in the primary table, and respective rectangles are scale-processed in the y-axis direction so as to generate processed unit rectangle information.

Figure 18:
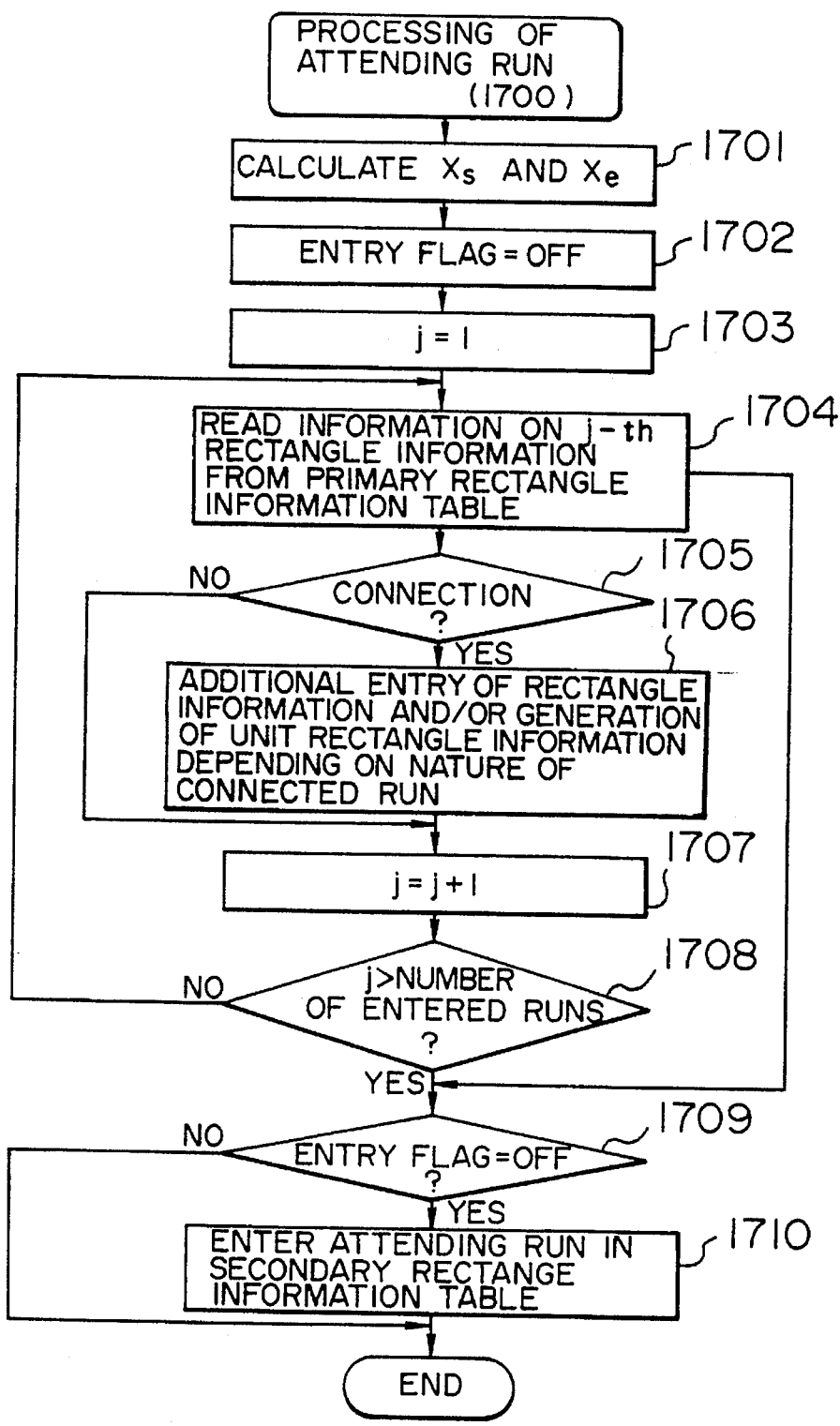
FIG. 18 is a detailed flow chart of an attending pixel run according to the fourth embodiment of the present invention.

FIG. 18 shows a detailed flow chart of the process of an attending pixel run in the process 1700 described above.

Step 1701: The attending pixel run is scale-processed in the x-axis direction. Either one of processing methods described in the second embodiment and the third embodiment may be used for the processing method. The coordinates of the start pixel and the end pixel of the attending pixel run in the scaled image are set to $X_s$ and $X_e$.

Step 1702: An entry flag showing whether the attending pixel run has been entered in the secondary table or not is initialized to "unentered" (=off).

Step 1703: A variable j for controlling readout of the primary table is initialized to "1".

Step 1704: Information on the jth rectangle of the primary table is read out. However, if there is no information on the jth rectangle in the primary table, the process is proceeded to a step 1709.

Step 1705: It is investigated whether the read out rectangle connects to the attending pixel run or not. Here, to connect means that there are pixels neighboring in the y-axis direction, and also means to satisfy $(X_{1s} \leq X_e)$ and $(X_{1e} \geq X_s)$ when it is assumed that the x-coordinates of the start pixel and the end pixel of the rectangle in the primary table are $X_{1s}$ and $X_{1e}$. When connection is made, the read out rectangle is referred to as a connection rectangle, and the process is proceeded to a step 1706. When connection is not made, the process is proceeded to a step 1707.

Step 1706: The process is performed in accordance with the positional relationship between the connection rectangle and the attending rectangle. The positional relationship includes nine cases shown in FIGS. 19a to 19i as described previously, but every case can be divided into following three portions (a), (b) and (c). So, process is performed on these three portions (a), (b) and (c), respectively.

Figure 19A:
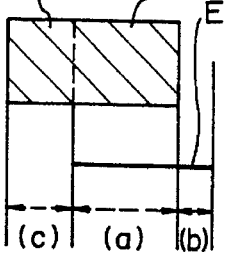
FIGS. 19a to 19i are explanatory diagrams of connected states of pixel runs.
Figure 19B:
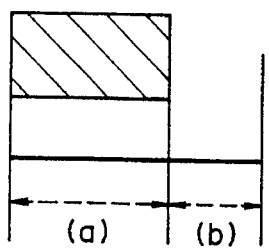
Figure 19C:
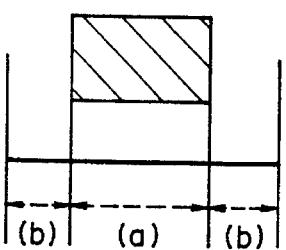
Figure 19D:
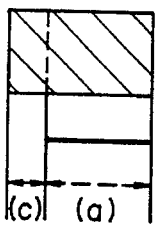
Figure 19E:
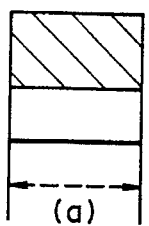
Figure 19F:
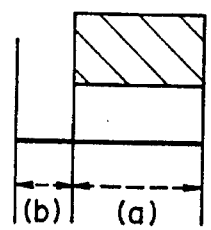
Figure 19G:
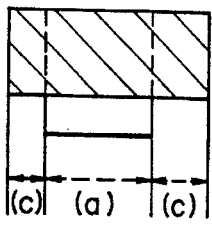
Figure 19H:
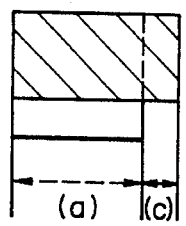
Figure 19I:
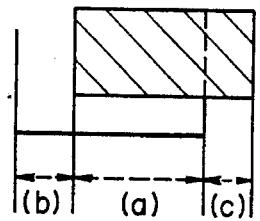

Here, description will also be made with reference to FIGS. 20a to 20c taking the case of FIG. 19i as an example.

(a) This is a portion of an attending pixel run in which there is a rectangle thereabove, and the rectangle in this portion is continued to be traced. Thus, the portion where the attending pixel run and the connection rectangle are overlapped each other (from the larger one among $X_s$ and $X_{1s}$ to the smaller one among $X_e$ and $X_{1e}$, i.e., from $X_{1s}$ to $X_e$ in FIG. 20a) are entered as the x coordinates of the start pixel and the end pixel, and the y coordinates of the start pixel are entered as a value $Y_{1s}$ as it is in the primary table, and the connection flag is entered as "non-connection" in the secondary table.

(b) This is a portion in the attending pixel run in which there is no rectangle thereabove, and tracing is started in this portion as the start of a new rectangle. The x coordinates of the start pixel and the end pixel are entered as $X_s$ and $X_{1s} -1$, the y coordinates of the start pixel is entered as $h_y$ which is related to the row under process presently, and the connection flag is entered as "non-connection" in the secondary table.

(c) This is a portion in which there is no pixel run thereunder. Since this portion is one in which connection of a rectangle in the y-axis direction has been completed, this portion is scaled in the y-axis direction and the rectangle is outputted to a memory for storing the image resulting from the process (processed unit rectangle information).

Step 1707: The variable j is renewed to j+1.

Step 1708: The step 1704 through the step 1708 are repeated with respect to all the rectangles entered in the primary table. When all the rectangles have been processed, the process is proceeded to a step 1709.

Step 1709: When the entry flag is "unentered" (=off), the process is proceeded to a step 1710, and the process is brought to an end in case of "processed" (=on).

Step 1710: The attending pixel run is entered in the secondary table. Namely, $X_s$ and $X_e$ are entered at the start pixel $X_{1s}$ and the end pixel $X_{1e}$ of x-coordinates of respective pixel runs, $h_y$ is entered at starting y coordinates $Y_{1s}$, and the continuation flag is set to "non-continuation" as initial setting.

In the fourth embodiment described above, it is possible to obtain a scaled image without requiring to generate intermediate image data scaled in one direction only. In the fourth embodiment, however, it is impossible to produce a scaled image row by row in scan sequence. Therefore, a memory for one image portion capable of random access is required for outputting a scaled image.

Fifth Embodiment

In a fifth embodiment, a scaled image is produced row by row in scan sequence. Fundamental process is similar to that in the fourth embodiment, but the output process is different. Namely, a rectangle is outputted immediately at a point of time when tracing of a rectangle is brought to an end and it becomes possible to output a rectangle in the fourth embodiment. Whereas, in the fifth embodiment, information on a rectangle to be outputted is stored once in an output table (FIG. 22), and the image is outputted in scan sequence by referring to the output table after the information on all the rectangles to be outputted is stored. This step is referred to as a scan sequence batch output system.

Figure 21:
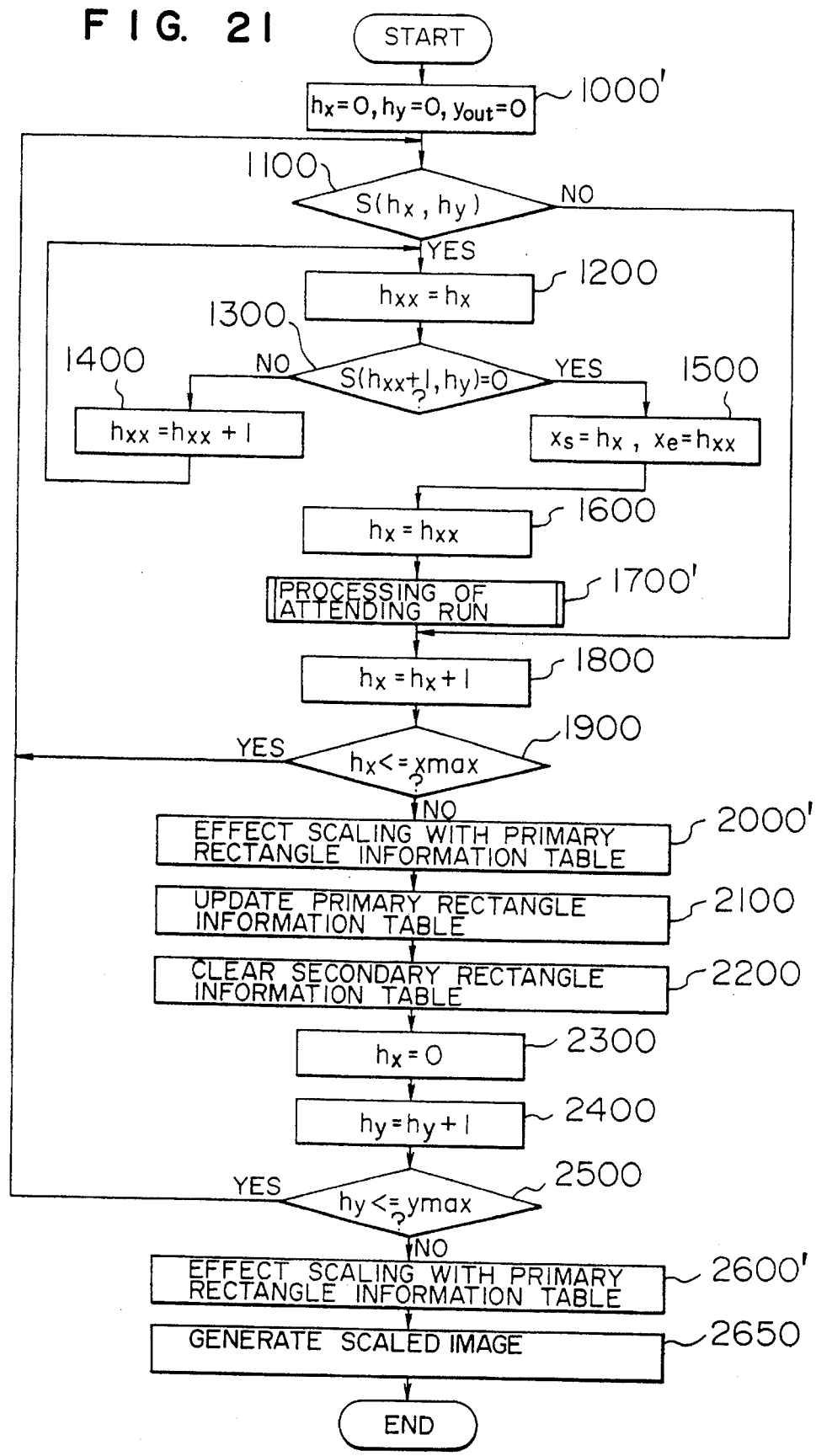
FIG. 21 is a flow chart of scan sequence batch processing according to a fifth embodiment of the present invention.

FIG. 21 shows a flow chart of the scan sequence batch output system. This flow chart is formed by changing the process contents of the step 1000, the step 1700, the step 2000 and the step 2600 of the flow chart shown in FIG. 17 and adding a step 2650 after the step 2600. The contents of the change and the addition will be described hereunder.

Step 1000: A variable y_out showing y coordinate of the output row is initialized to 0 in an output process.

Step 1700': The step 1700 of an attending pixel run shown in FIG. 18 is performed, but a process in which the process contents of the step 1706 are changed as described hereinafter is performed. Namely, in the process of the portion (a) in the step 1706, the information of the rectangle is entered in the image output table shown in FIG. 22 instead of outputting the rectangle. In this image output table, a start pixel $XX_{1s}$ and an end pixel $XX_{1e}$ in the x-axis direction of a rectangle, and a start pixel $YY_{1s}$ and an end pixel $YY_{1e}$ in the y-axis direction are recorded.

Step 2000' and Step 2600': The information of the rectangle is entered in the output table instead of outputting the rectangle.

Step 2650: An image is outputted using the output table. The following is repeated using y_out which shows the y-coordinate of an outputted row until the records of the output table shown in FIG. 22 disappear.

(1) Respective records of the output table are read in sequence.

(a)When $YY_{1s} \leq $ y_out $ \leq YY_{1e}$, a black pixel run with $XX_{1s}$ and $XX_{1e}$ as a first pixel and an end pixel is outputted.

(b)When $YY_{1e}<$y_out, this record is deleted from the output table.

(2) y_out=y_out+1 is set.

It is possible to output a scaled image row by row in sequence by this method. When the records of the output table are sorted in advance with the value of $XX_{1s}$, the black pixel run can be outputted in the sequence of x-coordinates even in one row. Even if unsorted, it is sufficient that a memory for one row portion is provided.

Since it is possible to output a scaled image row by row in scan sequence in the fifth embodiment described above, it is suitable for facsimile.

Sixth Embodiment

In a sixth embodiment, an image is outputted using the output table and the rectangle information table every time when the process of one row portion of an original image is completed. With this, it is possible to output an image resulting from the process synchronously with the progress of the process of the original image. This is referred to as a scan sequence synchronous output system. In this system, a rectangle is outputted, among those entered in the rectangle information table and in the output table and ready for outputting, every time when the process of one row of an original image is terminated, contrary to the fifth embodiment in which an image resulting from the process is outputted in scan sequence using the output table after the process of the original image is terminated entirely. At a point of time when the process of certain row (y coordinates $i_y$) of the original image is terminated, it becomes possible to output up to the row of the image resulting from the process corresponding to this $i_y$ row. Further, all the rectangle information resulting from the process up to this row is existent in the rectangle information table and the output table. Accordingly, it is possible to also output the image resulting from the process sequentially every time when the process of the original image is completed for one row.

Figure 23:
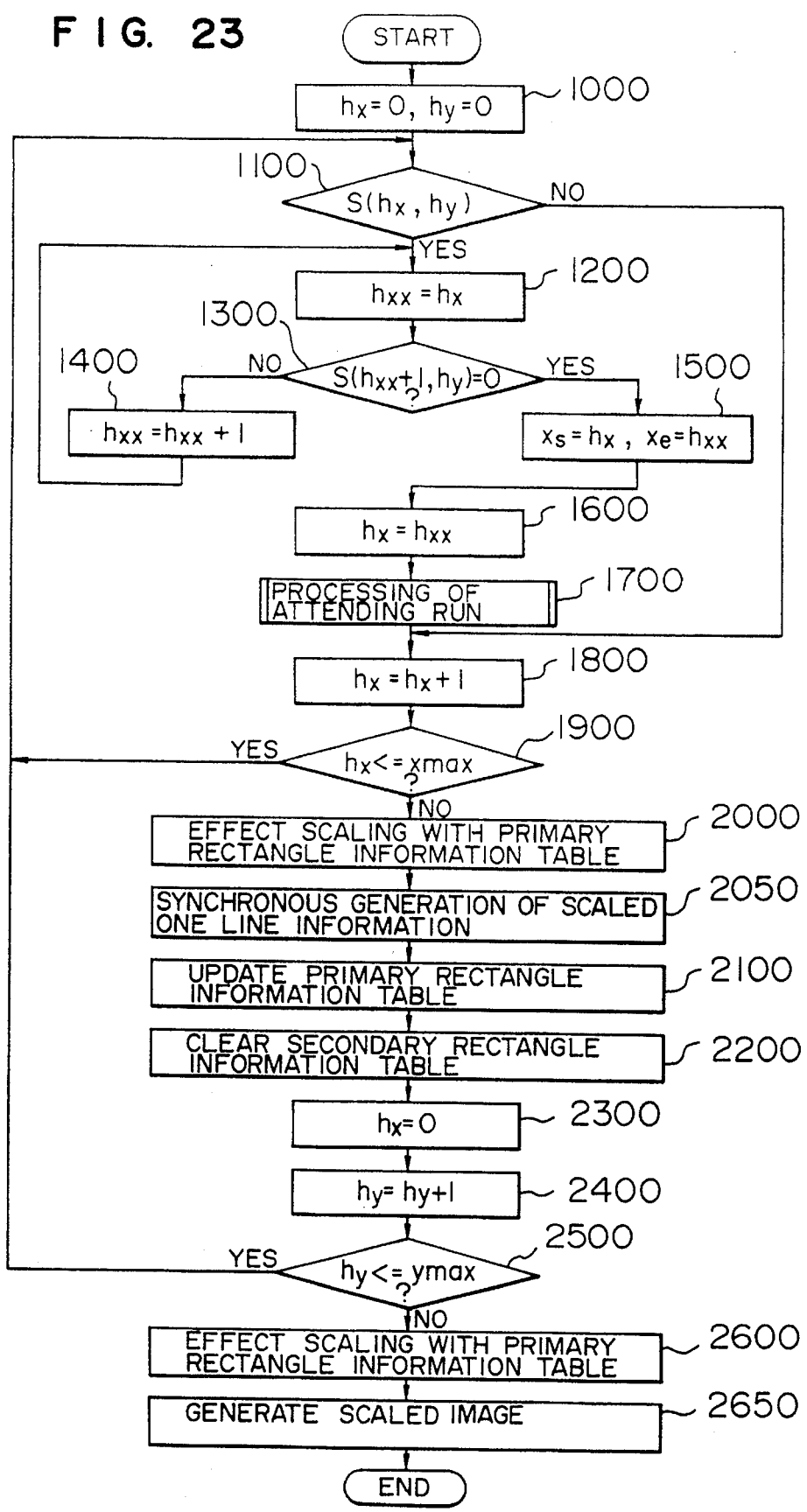
FIG. 23 is a flow chart of scan sequence synchronous generation processing according to a sixth embodiment of the present invention.

FIG. 23 shows a flow chart of a scan sequence synchronous output system. This flow chart is formed by adding a step 2050 after step 2000 in the flow chart shown in FIG. 21. The additional contents are described hereunder.

Step 2050: An image synchronous output process is performed.

Figure 24:
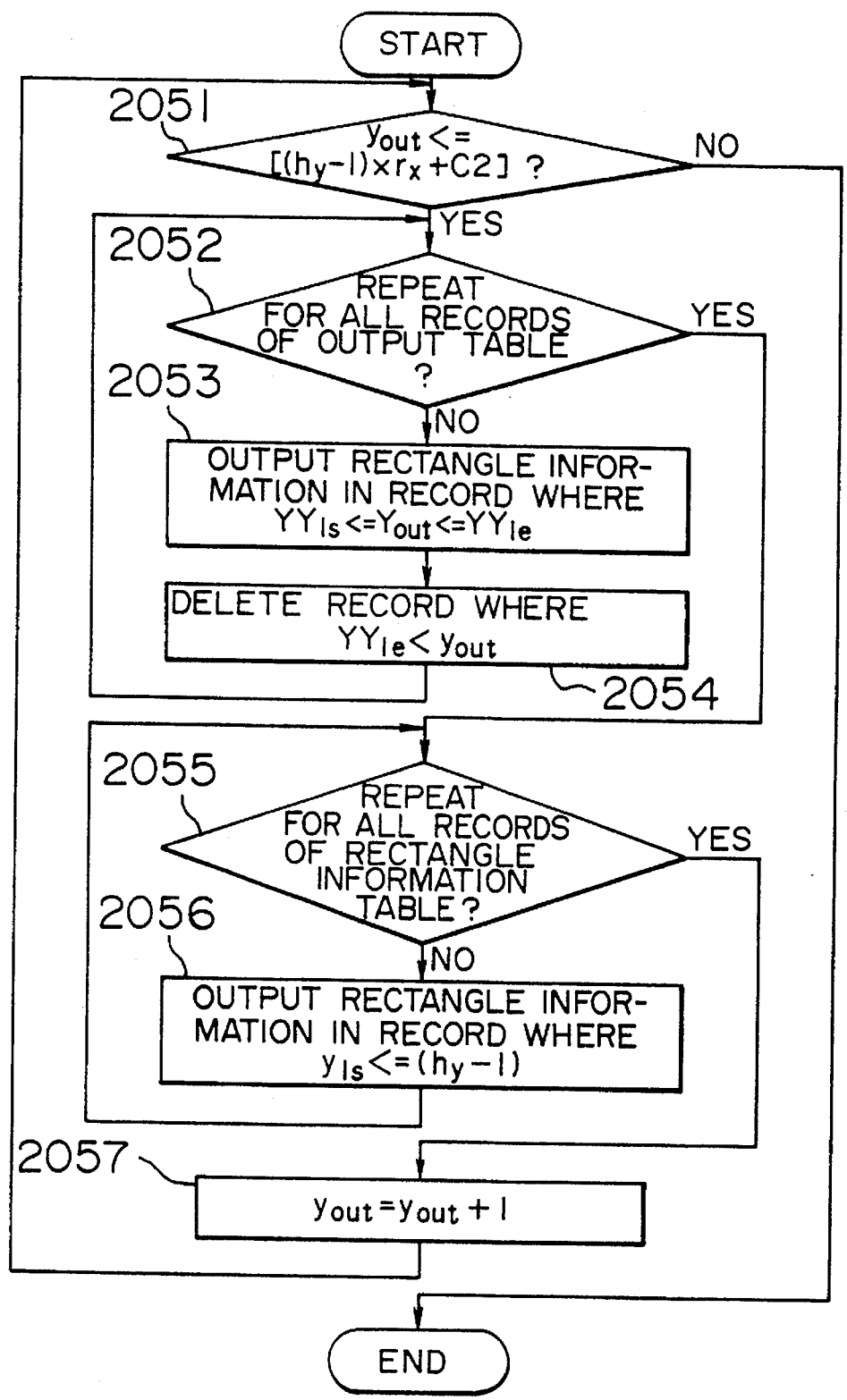
FIG. 24 is a detailed flow chart of image synchronous generation processing.

The image synchronous output process will be described with reference to a flow chart shown in FIG. 24.

Step 2051: It is determined whether y_out $\leq [(h_y-1) \cdot r_y + C2]$ is satisfied. Namely, since the process is completed up to $h_y$ in the original image at this stage, it is possible to output up to the y coordinate of a scaled image corresponding to $h_y$. In order to preserve the line width, however, the coordinates of the end pixel have to be obtained through computation from the coordinates of the start pixel and the pixel run length. In order to avoid to conduct such computation every time, up to one row ahead of the row (the previous row) where the process has been presently completed, i.e., the coordinates corresponding to $(h_y-1)$ is outputted. These coordinates can be computed by using the computation method in the second embodiment or the third embodiment but $[(h_y,1) \cdot r_y+C2]$ is obtained according to the computation method in the second embodiment. The output can be made if y_out is less than the above, and the process is proceeded to a step 2052. The process is brought to an end otherwise.

19

Step 2052: A step 2053 and a step 2054 are repeated with respect to all records of the output table.

Step 2053: The start pixel $YY_{1s}$ and the end pixel $YY_{1e}$ of the y coordinate of the record are read out in consequence, and a black pixel run with the start pixel $XX_{1s}$ and the end pixel $XX_{1e}$ of the x coordinate of the record as a start pixel and an end pixel is outputted when $YY_{1s} \leq y\_out \leq YY_{1e}$ is satisfied.

Step 2054: When the value of the end pixel $YY_{1e}$ of the read out record shows $YY_{1e} \leq y\_out$, the rectangles related to this record have been outputted completely. Hence, the record is deleted from the output table.

Step 2055: A step 2056 and a step 2057 are repeated with respect to all the records of the secondary rectangle information table in which the y coordinates of the original image are produced by processing the row of $h_y$.

Step 2056: When the value of the start y coordinate $y_{1s}$ of the read out record satisfies $Y_{1s} \leq (h_y-1)$, a black pixel run with the start pixel $X_{1s}$ and the end pixel $X_{1e}$ of the x coordinates of the record as a start pixel and a end pixel is outputted.

Step 2057: The value of y_out is renewed to y out+1, and the process is returned to the step 2051.

According to the sixth embodiment described above, it is possible to output the scaled image row by row synchronously with the progress of the process of the original image. When respective records of the output table are sorted with the value of $XX_{1s}$ and respective records of the pixel run information table are also sorted with the value of $X_{1s}$, pixel runs can be generated in sequence of x coordinates in one row. Even if the records are not sorted, it is sufficient that a memory for one row portion is provided.

According to the embodiments of the present invention described above, it is possible to prevent disappearance of thin lines and variations of line widths in scaling process. With this, it is possible to obtain a scaled image of high quality.

We claim:

1. A method of scaling a first image to obtain a second image, comprising the steps of:

scaling the first image to obtain an intermediate image;

projecting pixels of the intermediate image onto the first image to provide projected positions for second image pixels;

determining a positional correction amount for each of said projected positions from a pixel value of at least one of pixels of the first image near the projected position;

correcting each projected position by its corresponding determined correction amount; and determining a pixel value of each second image pixel from a pixel value of a first image pixel near the projected position after correction.

2. A method according to claim 1, wherein the first image is a binary image, and determination of said positional correction amount is effected by moving a particular projected position such that a distance between said particular projected position and a boundary between a white area and a black area on said first image is constant, said particular projected position being one of said projected positions nearest to said boundary between white and black areas among projected positions in the black area of the first image, said boundary being determined by positional relations among white pixels and black pixels of the first image.

3. A method of scaling a first image having a plurality of pixel runs to a obtain a second image having a plurality of pixel runs, comprising the steps of:

20 obtaining, in a row direction and a column direction, first scaled boundary coordinates for a second image between first end pixels of pixel runs and second end pixels of pixel runs of different pixel values neighboring thereto by multiplying first boundary coordinates in a first image between first end pixels of pixel runs and second end pixels of pixel runs of different pixel values neighboring thereto by row direction and column direction scale factors;

obtaining scaled widths by multiplying row direction and column direction widths of the pixel runs in said first image by said row direction and column direction scale factors;

obtaining second scaled boundary coordinates for the second image between second end pixels of pixel runs and first end pixels of pixel runs of different pixel values neighboring thereto by adding values of said scaled widths to said first scaled boundary coordinates for the second image; and obtaining coordinates of the first end pixels and the second end pixels of the pixel runs of the second image from said scaled first boundary coordinates and scaled second boundary coordinates.

4. A method of scaling a first image having black and white pixels located on points of a first scale lattice to obtain a second image having black and white pixels located on points of a second scale lattice, the black pixels and white pixels of the first image forming at least one black area and at least one white area, respectively, the method comprising:

projecting the second scale lattice onto the first scale lattice to determine four reference lattice points surrounding, in the first scale lattice, a projected position of each pixel of the second image on one of points of the second scale lattice;

finding, in each of the black areas of the first image, a foremost projected position of a second image pixel which projected position is not outside said black area and is closest to one of outermost pixels in said black area of the first image;

determining a second image pixel having said foremost projected position to be a black pixel;

displacing said foremost projected position, found in each of said black areas of the first image, by a positional correction distance to a corrected projected position such that a predetermined distance is established between an intermediate point between said black area and a white area neighboring thereto and said corrected projected position in said first image, and displacing other projected positions of pixels of the second image by said positional correction distance to their corrected projected positions; and determining a pixel value of each of second image pixels having said other projected positions displaced to their corrected projected positions, by reference to at least one of four reference lattice points surrounding, in the first scale lattice, the corrected projected position of said each pixel.

5. A method of scaling a first image having black and white pixels defined by first scale coordinates to obtain a second image having black and white pixels defined by second scale coordinate with first and second scaling factors in row and column directions, runs of black pixels and runs of white pixels of the first image forming at least one black area and at least one white area, respectively, each of said black pixel runs having first and second end pixels and a width continuing from said first end pixel to said second end pixel, the method comprising:

determining a second scale row direction coordinate of a first end pixel of a black pixel run in the first image in accordance with said first scaling factor, said determined second scale row direction coordinate of the first end pixel run having a first integer value;

multiplying a width of said black pixel run by said first scaling factor to provide a first pixel run width product and converting said first pixel run width product to a second integer value thereby obtaining an integer value scaled width;

adding said integer value scaled width to said second scale row direction coordinate of the first end pixel of said black pixel run having said second integer value to obtain second scale row direction coordinate of a second end pixel of said black pixel run, thereby scaling said black pixel run in said row direction;

storing, in a rectangle information table, information on a first scale column direction coordinate of the first end pixel and said second scale row direction coordinates of the first and second end pixels of the black pixel run scaled in said row direction;

recognizing all black pixel runs, scaled with said first scaling factor, that are located to consecutively neighbor the first-mentioned black pixel run scaled with said first scaling factor and have the same width as that of the first-mentioned black pixel run by use of said information stored in said rectangle information table to thereby find a first scale column direction coordinate of a black pixel run located farthest from the first-mentioned black pixel run among said neighboring black pixel runs;

determining a second scale column direction coordinate of said first end pixel of the first-mentioned black pixel run in accordance with said second scaling factor, said determined second scale column direction coordinate of said first end pixel of the first-mentioned black pixel run having a third integer value;

multiplying a length from said first scale column direction coordinate of the first end pixel of the first-mentioned black pixel run stored in said rectangle information table to said first scale column direction coordinate of said farthest black pixel run by said second scaling factor to provide a second pixel run width product and converting said second pixel run width product to a fourth integer value thereby obtaining an integer scaled length; and adding said integer scaled length to said second scale column direction coordinate of the first-mentioned black pixel run having said third integer value, to obtain a second scale column direction coordinate of said farthest black pixel run, thereby scaling the first-mentioned black pixel run and said black pixel runs consecutively neighboring thereto in said column direction to provide information on a scaled rectangle representative of the first-mentioned black pixel run and said black pixel runs consecutively neighboring thereto in said column direction.

6. A method of scaling a first image having a plurality of pixel runs each having predetermined pixel values to obtain a second image having a plurality of pixel runs, comprising the steps of:

obtaining second image coordinates of a first end pixel of pixel runs by multiplying values of first image coordinates of said first end pixel of the pixel runs in a row direction and a column direction by row direction and column direction scale factors to provide respective coordinate products and by converting said coordinate products to integer values for said second image coordinates of the first end pixel of the pixel runs;

obtaining row direction and column direction scaled widths by multiplying row direction and column direction widths of first image pixel runs by the scale factors to provide respective pixel run width products and by converting said pixel run width products to integer values for said scaled widths; and obtaining second image coordinates of second end pixels of pixel runs by adding the integer valued scaled widths to the second image integer valued coordinates of said first end pixel of the pixel runs; and wherein pixel runs in said first image are scaled in one of said row and column directions on a row-by-row base or on a column-by-column directions on a row-by-row base or on a column-by-column base, comprising the steps of, a) recording, in a rectangle information table, a second image pixel run produced by scaling a first image pixel run in said one direction, b) comparing a next second image pixel run, produced by similarly scaled, with said recorded second image pixel run to determine whether or not said next second image pixel run has a first run portion which connects with said recorded second image pixel run as viewed in the other of said directions, whether or not said next second image pixel run has a second run portion which does not connect with said recorded second image pixel run as viewed in said one direction, and whether or not said recorded second pixel run has a portion which does not connect with said subsequent second pixel run as viewed in said other direction, c) processing said next second image pixel run and said rectangle information table in such a manner that said first run portion of the subsequent second pixel run, when detected by said comparison, is recorded as a continuation of said recorded second image pixel run in said rectangle information table, said second run portion of the subsequent second pixel run, when detected by said comparison, is newly entered in said rectangle information table, and said portion of the recorded second pixel run which does not connect with said subsequent second pixel run when detected by said comparison, is scaled in the other direction to form information on a rectangle, d) generating information in said portion of the recorded second pixel run which does not connect with said subsequent second pixel run and which has been scaled in both of said directions, and e) repeating said steps a) to d) for each of the second image pixel runs.

7. A method according to claim 6, wherein:

in lieu of generating information related to a rectangle scaled in a row direction and a column direction, coordinates of vertices of the rectangle are recorded in an output table; and a scaled image is generated row by row based on coordinates of first and second end pixels of scaled pixel runs recorded in said output table at a point of time when scaling process is brought to an end on the whole of the first image.

8. A method according to claim 6, wherein:

in lieu of generating information related to a rectangle scaled in a row direction and a column direction, coordinates of vertices of the rectangle are recorded in an output table; and pixel runs of the second image are generated with respect to one of the row and the column thereof using said output table and rectangle information table every time when the process of one of one row portion and one column portion of the first image is terminated.

9. An image scaling system comprising:

means for receiving pixels representative of a first image;

means for receiving pixels representative of a second image, which second image is a scaled representation of the first image;

means for scaling the first image to obtain an intermediate image;

means for projecting pixels of the intermediate image onto the first image to provide projected positions for second image pixels;

means for determining a positional correction amount for each projected positions from a pixel value of at least one of pixels of the first image near the projected position;

means for correcting each projected position by its corresponding determined correction amount; and means for determining a pixel value of each second image pixel from a pixel value of a first image pixel near the projected position after correction.

* * * * *